(12) United States Patent
Kadnikov

(10) Patent No.: US 11,577,557 B2
(45) Date of Patent: Feb. 14, 2023

(54) TRAILER HITCH

(71) Applicant: ACPS Automotive GmbH, Ingersheim (DE)

(72) Inventor: Aleksej Kadnikov, Leonberg (DE)

(73) Assignee: ACPS Automotive GmbH, Ingersheim (DE)

( * ) Notice: Subject to any disclaimer, the term of this patent is extended or adjusted under 35 U.S.C. 154(b) by 67 days.

(21) Appl. No.: 17/082,694

(22) Filed: Oct. 28, 2020

(65) Prior Publication Data

US 2021/0129606 A1 May 6, 2021

(30) Foreign Application Priority Data

Oct. 30, 2019 (DE) .......................... 102019129347.2

(51) Int. Cl.
| | |
|---|---|
| *B60D 1/06* | (2006.01) |
| *B60D 1/42* | (2006.01) |
| B60D 1/54 | (2006.01) |

(52) U.S. Cl.
CPC ................ *B60D 1/06* (2013.01); *B60D 1/42* (2013.01); *B60D 2001/544* (2013.01)

(58) Field of Classification Search
CPC ............ B60D 1/54; B60D 1/544; B60D 5/26
See application file for complete search history.

(56) References Cited

U.S. PATENT DOCUMENTS 10,189,323 B2 * 1/2019 Kadnikov ................ B60D 1/06

FOREIGN PATENT DOCUMENTS

| DE | 102014011348 A1 | 2/2015 | |
|---|---|---|---|
| DE | 102015109411 A1 | 12/2016 | |
| DE | 102018124518 A1 | 4/2020 | |
| EP | 2792514 A2 | 10/2014 | |
| EP | 2792513 B1 * | 12/2015 | ............... B60D 1/54 |
| EP | 3098096 A2 | 5/2016 | |

(Continued)

*Primary Examiner* — Kevin Hurley
(74) *Attorney, Agent, or Firm* — Reinhart Boerner Van Deuren P.C.

(57) ABSTRACT

In order to connect a trailer hitch, comprising a ball neck, which is movable between an operative position and a rest position and has a pivot bearing body arranged at a first end and a coupling ball arranged at a second end, a pivot bearing unit, which is arranged fixed to the vehicle by means of a carrier that is configured to be secured to a vehicle body, wherein by means of the pivot bearing unit, which has a pivot bearing housing, the pivot bearing body is mounted such that it is pivotal about a pivot axis between the operative position and the rest position, and a rotation-blocking device that, in at least one rotation-blocking position, blocks a pivotal movement of the pivot bearing body about the pivot axis in relation to the pivot bearing unit and, in a release position, releases such pivotal movement, to the carrier in a manner that is stable and simple to assemble, it is proposed that the pivot bearing housing should pass through a receptacle in a bearing part of the carrier and in so doing be held by positively engaging elements such that it cannot rotate in relation thereto, and that on either side of the receptacle the pivot bearing housing should be fixed by support bodies that abut against the bearing part and are supported against both the pivot bearing housing and the bearing part.

21 Claims, 19 Drawing Sheets

(56) References Cited

FOREIGN PATENT DOCUMENTS

| | | | | |
|---|---|---|---|---|
| EP | 1886847 B2 | 6/2016 | | |
| EP | 3141405 A1 | 3/2017 | | |
| EP | 3141406 A1 | 3/2017 | | |
| EP | 2796303 B1 * | 5/2018 | ............... | B60D 1/06 |
| EP | 2141034 B2 | 6/2019 | | |
| EP | 226682 B2 | 10/2019 | | |

* cited by examiner

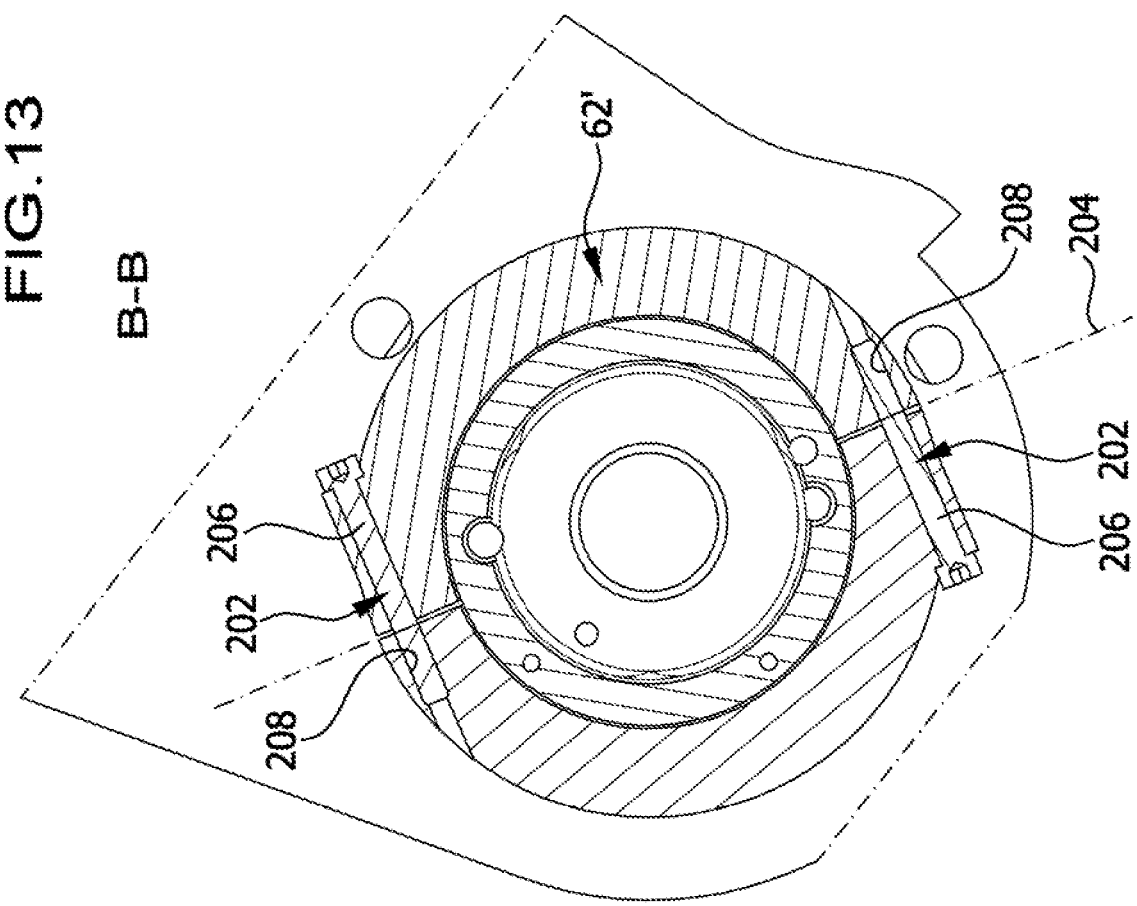
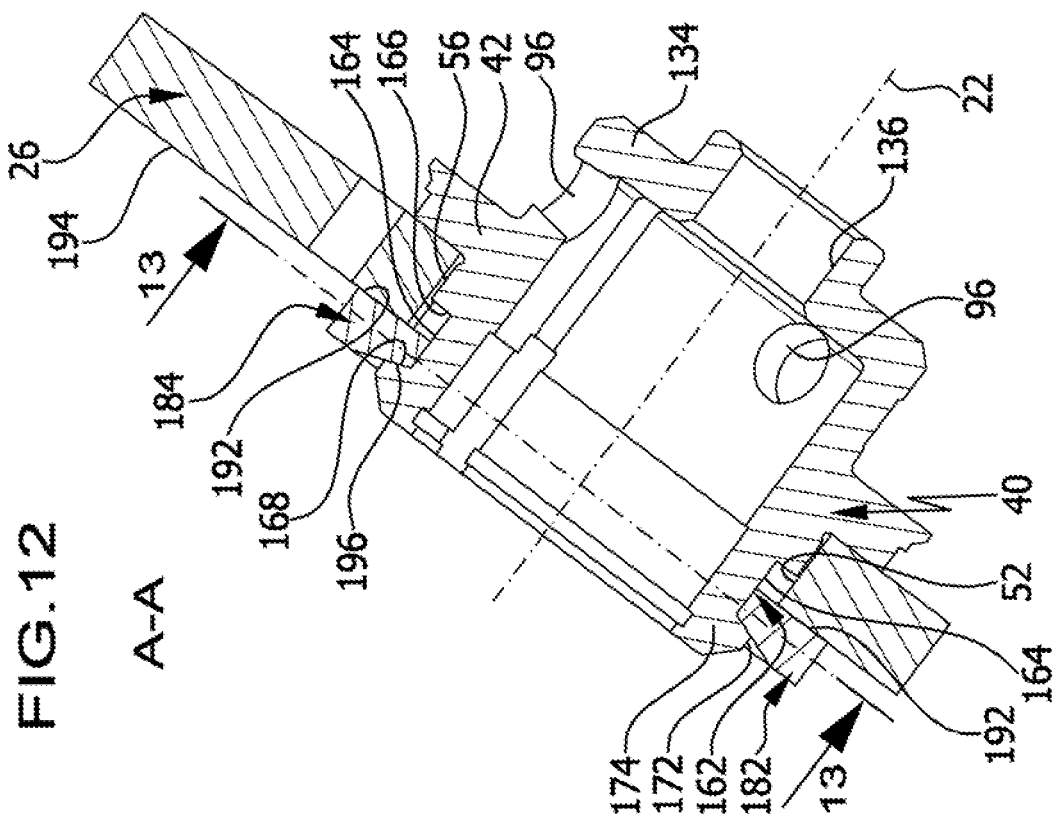

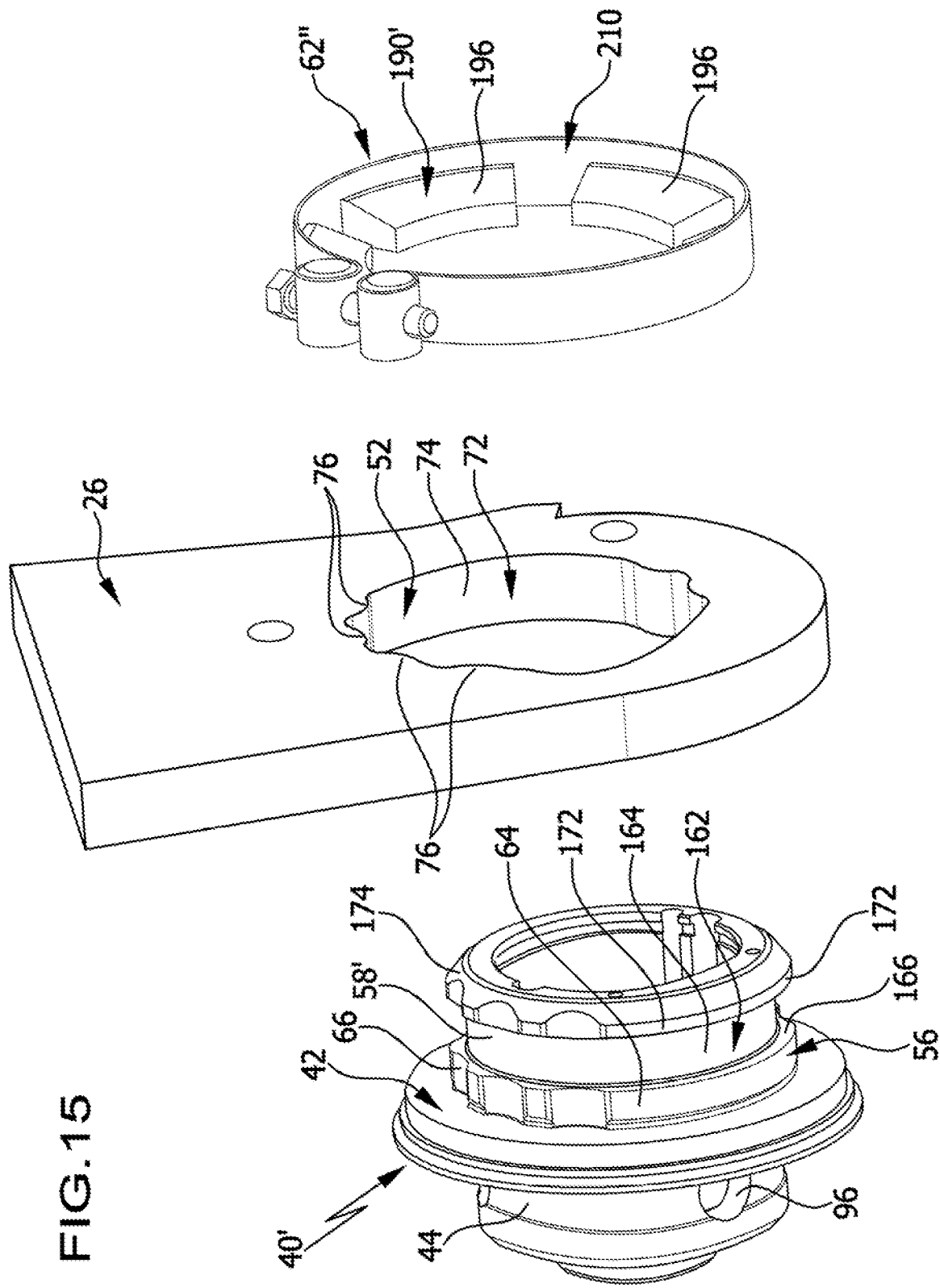

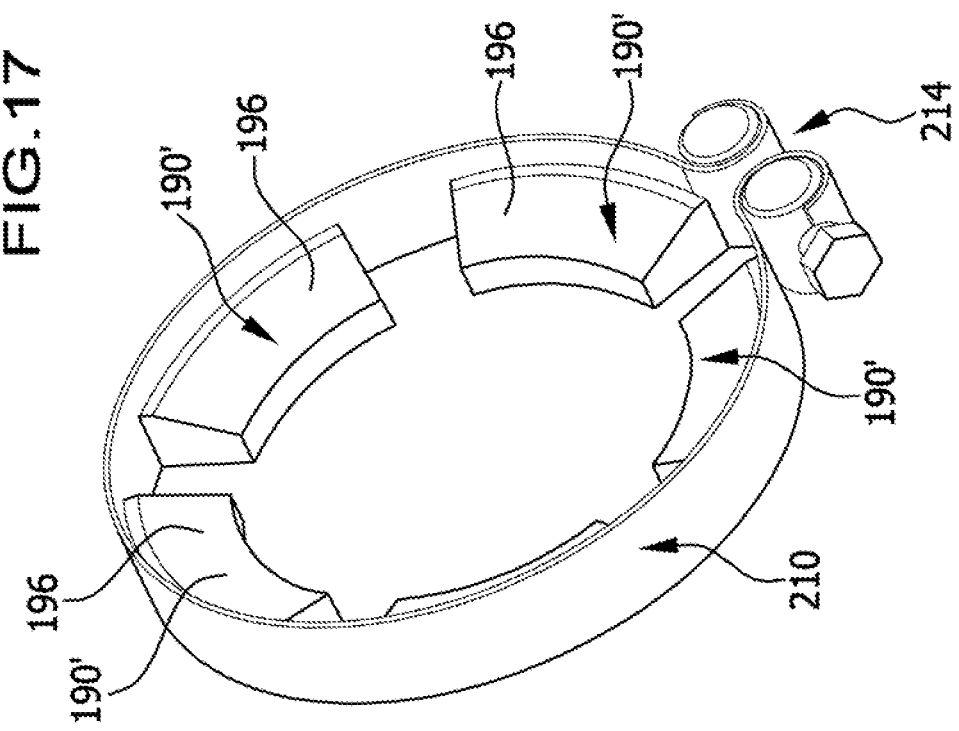
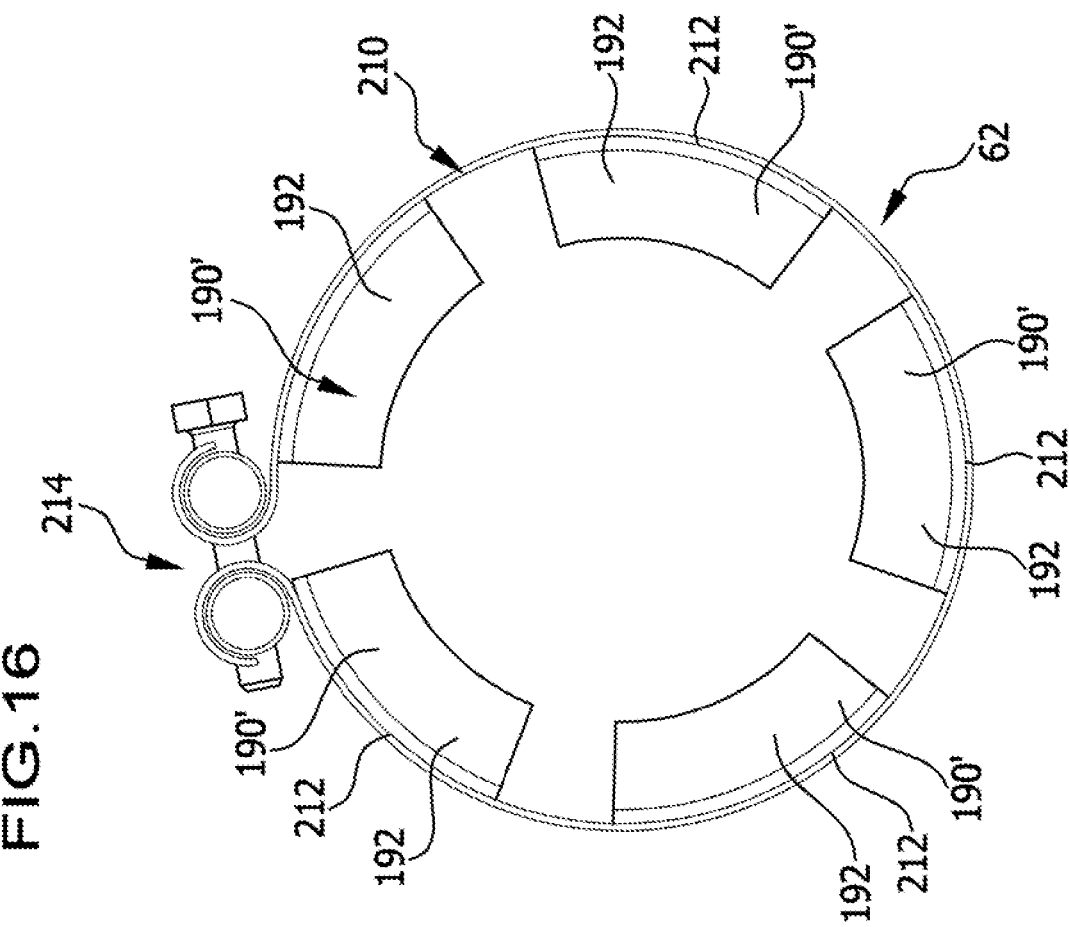

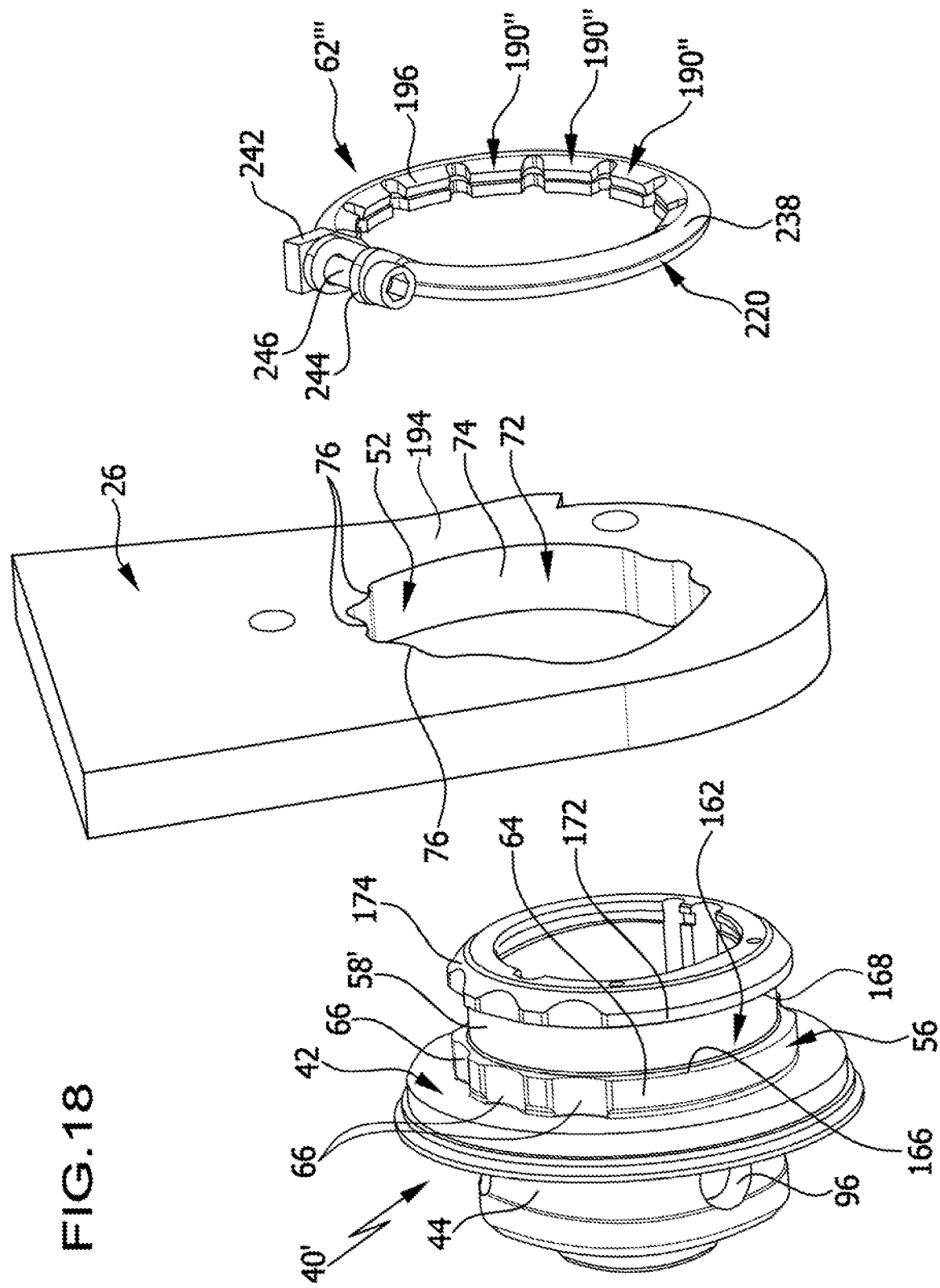

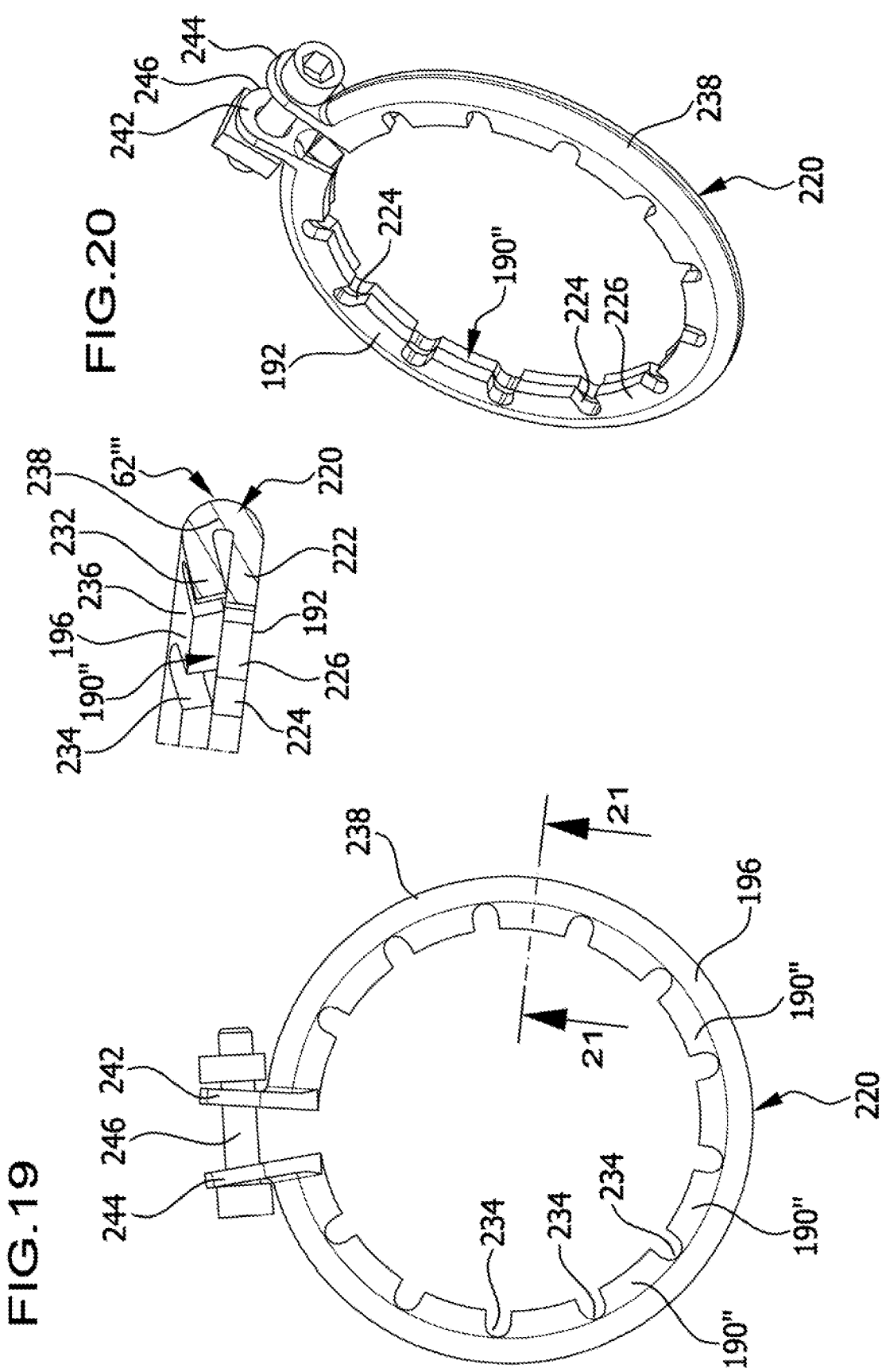

TRAILER HITCH

CROSS-REFERENCE TO RELATED PATENT APPLICATION

This patent application claims the benefit of German application No. 10 2019 129 347.2, filed Oct. 30, 2019, the teachings and disclosure of which are hereby incorporated in their entirety by reference thereto.

BACKGROUND OF THE INVENTION

The invention relates to a trailer hitch, comprising a ball neck, which is movable between an operative position and a rest position and has a pivot bearing body arranged at a first end and a coupling ball arranged at a second end, a pivot bearing unit, which is arranged fixed to the vehicle by means of a carrier that is configured to be secured to a vehicle body, wherein by means of the pivot bearing unit, which has a pivot bearing housing, the pivot bearing body is mounted such that it is pivotal about a pivot axis between the operative position and the rest position, and a rotation-blocking device that, in at least one rotation-blocking position, blocks a pivotal movement of the pivot bearing body about the pivot axis in relation to the pivot bearing unit and, in a release position, releases such pivotal movement.

Trailer hitches of this kind are known from the prior art, and a requirement thereof is to connect the pivot bearing unit to the carrier as simply, stably and reliably as possible.

SUMMARY OF THE INVENTION

This object is achieved with a trailer hitch of the type mentioned in the introduction in that the pivot bearing housing passes through a receptacle in a bearing part of the carrier and in so doing is held by positively engaging elements such that it cannot rotate in relation thereto, and in that on either side of the receptacle the pivot bearing housing is fixed by support bodies that abut against the bearing part and are supported against both the pivot bearing housing and the bearing part.

The advantage of the solution according to the invention can thus be seen in the (act that, on the one hand, it is possible to mount the pivot bearing housing on the carrier in a simple manner and on the other the connection between the pivot bearing housing and the carrier is stable, in order to take up the forces acting on the pivot bearing unit in the operative position and transfer them to the vehicle body.

As regards the construction of the support bodies, it is favorable if the support bodies are supported against the bearing part by support faces outside the receptacle, in order in this way to achieve particularly stable fixing, in particular fixing that is stable against tilting, of the pivot bearing housing in relation to the bearing part.

In particular, it is advantageous here if the bearing pan is clamped between the support bodies.

Clamping the bearing part between the support bodies in this manner can advantageously be achieved if the support face of at least one of the support bodies is movable in relation to the pivot bearing housing in the direction of the other support body by elements bringing about clamping.

More detailed statements have not yet been made as regards the form taken by the receptacle in the bearing part for the pivot bearing housing.

For example, the receptacle in the bearing part could take the shape of a fork.

However, a particularly advantageous solution provides for the receptacle in the bearing part to be formed by an aperture therein, such that the bearing part in particular entirely surrounds the receptacle and thus provides the required stability.

Preferably here, the pivot bearing housing can favorably be fixed to the receptacle in that the pivot bearing housing has a projecting portion that passes through the receptacle in the bearing part and can thus be held by the receptacle in a simple manner.

As regards the form taken by the positively engaging elements, the most diverse possibilities are conceivable.

For example, the positively engaging elements could be contours that are configured to be fixed by wedge elements that are insertable between them, such that they cannot rotate in relation to one another.

However, a particularly advantageous solution provides for the positively engaging elements to have complementary contours that differ from a circle contour, with the result that the contours produce a connection such that they cannot rotate in relation to one another that is free of wedge bodies—that is to say that does not make use of an additional wedge body.

In particular, the contours are contours that differ from a circle contour in the radial direction and differ from a circle contour radially inward and/or radially outward.

In particular here, it is provided for the aperture in the bearing part to have an internal contour that varies radially in relation to the pivot axis, and for the projecting portion to have an external contour that varies radially in relation to the pivot axis.

In particular here, it is favorable if the radially varying internal contour of the aperture takes a form corresponding to the radially varying external contour of the projecting portion, resulting in contours that are as precisely complementary as possible, and these enable on the one hand simple mounting by inserting the projecting portion in the aperture and on the other a connection between the bearing part and the projecting portion of the pivot bearing housing that is in particular stable against a torsional movement.

More detailed statements have not yet been made as regards the form taken by the support bodies.

For example, an advantageous solution provides for one of the support bodies supported against both the pivot bearing housing and the bearing part to be arranged fixed to the pivot bearing housing.

This solution is particularly simple from a structural point of view if the support body is integrally formed in one piece with the pivot bearing housing.

In the simplest case, a support body of this kind is a flange that is arranged on the pivot bearing housing and can in particular be integrally formed in one piece with the pivot bearing housing.

So that the bearing part can be clamped between the support faces in a simple manner, it would be conceivable for example for a support face of one of the support bodies to take a form that is movable relative to this support body.

However, a solution that is particularly simple to realize from a structural point of view provides for one of the support bodies to be adjustable relative to the pivot bearing housing.

Adjustability of this kind relative to the pivot bearing housing can be realized in the most diverse ways.

For example, a solution provides for the support body to be held at a holding receptacle of the projecting portion and to be adjustable relative to the pivot bearing housing by a relative movement in relation to the holding receptacle.

For this purpose, the most diverse possibilities for realization are conceivable.

A favorable solution provides for the support body to be adjustable relative to the holding receptacle by at least one support element arranged on the support body, and at least one support element that cooperates with this support element and is arranged at the holding receptacle, wherein at least one of these has a support face that varies in the axial direction of the projecting portion.

This means that the support element that varies in the axial direction is either arranged on the support body or at the holding receptacle, and that the support element corresponding thereto is arranged at the holding receptacle or the support body.

These support elements may be for example mutually engaging threads.

However, it would also be conceivable for the support element that varies in the direction in the axial direction of the projecting portion to take the form of a cam track that cooperates with a support element that takes the form of a cam follower, such that relative rotation of the support elements brings about adjustment of the support body relative to the holding receptacle.

Another advantageous solution provides for the support body to be adjustable relative to the holding receptacle by at least one support element that is arranged on the support body, and at least one support element that cooperates with this support element and is arranged at the holding receptacle, wherein at least one of these elements has a support face that varies in the radial direction of the projecting portion.

A solution of this kind can be embodied in particular in that one of the support elements has a wedge face that is formed on the holding receptacle, and/or the other of the support elements has a wedge body that is movable radially in relation to the projecting portion and has a wedge face.

In particular, the wedge face can be realized in that the holding receptacle takes the form of a groove and in that in particular at least one groove wall thereof forms a wedge face of this kind.

In a case of this kind, the groove wall that carries the wedge face runs preferably conically in relation to the pivot axis and in particular with increasing spacing from an opposing groove wall of the groove that faces this groove wall.

In this case, the support element cooperating with this wedge face may not itself be provided with a wedge face, or may likewise be provided with a wedge face.

Further, it is advantageous if a plurality of support elements are provided on the support body.

Providing a plurality of support elements on the support body has the advantage that in that case they can be optimally adapted, by relative movements, to tolerances between the support body, the holding receptacle and the bearing part in order to ensure optimal support.

In this case, an advantageous solution provides for the plurality of support elements to be formed by two ring segments of a holding ring that are configured to be clamped to one another by clamping devices.

Another advantageous solution provides for at least three support elements in the form of segments, in particular arc segments, to be provided and are urged by a support element carrier.

A support element carrier of this kind enables, in optimum manner, relative movements of the support elements in relation to one another, in order—as described above—to compensate for tolerances.

It is particularly favorable if the support element carrier has the effect of urging the support elements radially, in the direction of the holding receptacle.

In this case, the support element carrier may be a separate part that carries the support elements.

Another advantageous solution provides for the support element carrier to be a part on which the support elements are integrally formed.

It is particularly favorable if the support element carrier takes the shape of a C and the open ends thereof are moved toward one another by a clamping element in order to urge the support elements in the radial direction, toward the holding receptacle.

Thus, the description above of solutions according to the invention comprises in particular the different combinations of features that are defined by the sequentially numbered embodiments below:

1. A trailer hitch, comprising a ball neck (10), which is movable between an operative position (A) and a rest position (R) and has a pivot bearing body (14) arranged at a first end (12) and a coupling ball (18) arranged at a second end (16), a pivot bearing unit (20), which is arranged fixed to the vehicle by means of a carrier (24) that is configured to be secured to a vehicle body (F), wherein by means of the pivot bearing unit (20), which has a pivot bearing housing (40), the pivot bearing body (14) is mounted such that it is pivotal about a pivot axis (22) between the operative position (A) and the rest position (R), and a rotation-blocking device (90) that, in at least one rotation-blocking position, blocks a pivotal movement of the pivot bearing body (14) about the pivot axis (22) in relation to the pivot bearing unit (20) and, in a release position, releases such pivotal movement, wherein the pivot bearing housing (40) passes through a receptacle (52) in a bearing part (26) of the carrier (24) and in so doing is held by positively engaging elements (56, 72) such that it cannot rotate in relation thereto, and wherein on either side of the receptacle (52) the pivot bearing housing (40) is fixed by support bodies (42, 62) that abut against the bearing part (26) and are supported against both the pivot bearing housing (40) and the bearing part (26).

2. The trailer hitch according to embodiment 1, wherein the support bodies (42, 62) are supported against the bearing part (26) by support faces (86, 88; 86, 192) outside the receptacle (52).

3. The trailer hitch according to embodiment 1 or 2, wherein the bearing part (26) is clamped between the support bodies (42, 62).

4. The trailer hitch according to embodiment 3, wherein at least the support face (86, 88, 86, 192) of at least one of the support bodies (62, 42) is movable in relation to the pivot bearing housing (40) in the direction of the other support body (42, 62) by elements (82, 84, 168, 196) bringing about clamping.

5. The trailer hitch according to one of the preceding embodiments, wherein the receptacle (52) in the bearing part (26) is formed by an aperture therein.

6. The trailer hitch according to one of the preceding embodiments, wherein the pivot bearing housing (40) has a projecting portion (54) that passes through the receptacle (52) in the bearing part (26).

7. The trailer hitch according to one of the preceding embodiments, wherein the positively engaging elements (56, 72) have complementary contours (56, 72) that differ from a circle contour.

8. The trailer hitch according to one of the preceding embodiments, wherein the aperture (52) in the bearing part (26) has an internal contour (72) that varies radially in relation to the pivot axis (22), and wherein the projecting portion (54) has an external contour (56) that varies radially in relation to the pivot axis (22).

9. The trailer hitch according to embodiment 8, wherein the radially varying internal contour (72) of the aperture (52) takes a form corresponding to the radially varying external contour (56) of the projecting portion (54).

10. The trailer hitch according to one of the preceding embodiments, wherein one of the support bodies (42) supported against both the pivot bearing housing (40) and the bearing part (26) is arranged fixed to the pivot bearing housing (40).

11. The trailer hitch according to embodiment 10, wherein the support body (42) is integrally formed in one piece with the pivot bearing housing (40).

12. The trailer hitch according to one of the preceding embodiments, wherein one of the support bodies (62) is adjustable relative to the pivot bearing housing (40).

13. The trailer hitch according to embodiment 12, wherein the support body (62) is held at a holding receptacle (58) of the projecting portion (54) and is adjustable relative to the pivot bearing housing by a relative movement in relation to the holding receptacle (58, 58').

14. The trailer hitch according to embodiment 13, wherein the support body (62) is adjustable relative to the holding receptacle (58) by at least one support element (82) arranged on the support body (62) and at least one support element (84) that cooperates with this support element (82) and is arranged at the holding receptacle (58), wherein at least one of these has a support face that varies in the axial direction of the projecting portion (54).

15. The trailer hitch according to embodiment 13, wherein the support body (62) is adjustable relative to the holding receptacle (58') by at least one support element (196) that is arranged on the support body (62), and at least one support element (170) that cooperates with this support element (196) and is arranged at the holding receptacle (58'), wherein at least one of these has a support face (170, 196) that varies in the radial direction of the projecting portion (54).

16. The trailer hitch according to embodiment 15, wherein one of the support elements (168) has a wedge face (170) that is formed on the holding receptacle (58'), and/or the other of the support elements has a wedge body (190) that is movable radially in relation to the projecting portion (54) and has a wedge face (196).

17. The trailer hitch according to embodiment 15 or 16, wherein the holding receptacle (58') takes the form of a groove (162), and wherein in particular a groove wall (168) forms the wedge face (170).

18. The trailer hitch according to embodiment 16 or 17, wherein a plurality of support elements (190, 190', 190") are provided on the support body (62).

19. The trailer hitch according to embodiment 18, wherein the plurality of support elements (190) are formed by two ring segments (182, 184) of a holding ring (62') that are configured to be clamped to one another by clamping devices (202).

20. The trailer hitch according to one of embodiments 14 to 18, wherein at least three support elements (190', 190") in the form of segments, in particular are segments, are provided and are urged by a support element carrier (212, 238).

21. The trailer hitch according to embodiment 20, wherein the support element carrier (212, 238) has the effect of urging the support elements (190') in the direction of the holding receptacle (58').

22. The trailer hitch according to embodiment 20 or 21, wherein the support element carrier (212, 238) takes the shape of a C, and wherein the ends (242, 244) thereof are moved toward one another by a clamping element (214, 246).

Further features and advantages of the solution according to the invention form the subject matter of the description below and the representation in the drawing of an exemplary embodiment.

BRIEF DESCRIPTION OF THE DRAWINGS

FIG. 8 shows a plan view in the direction of the arrow A in FIG. 7, after assembly, but without the holding ring screwed on;

FIG. 1I shows a perspective exploded illustration, similar to FIG. 7, of a second exemplary embodiment;

FIG. 12 shows an enlarged section, similar to FIG. 6, through the pivot bearing housing and the bearing part, after assembly;

FIG. 13 shows a section along the line 13-13 in FIG. 12;

FIG. 15 shows a perspective exploded illustration, similar to FIG. 11, of a third exemplary embodiment;

FIG. 16 shows a plan view of the holding ring of the third exemplary embodiment;

FIG. 17 shows a perspective illustration of the holding ring of the third exemplary embodiment;

FIG. 18 shows a perspective exploded illustration, similar to FIG. 15, of a fourth exemplary embodiment;

FIG. 19 shows a plan view, similar to FIG. 16, of the holding ring of the fourth exemplary embodiment;

FIG. 20 shows a perspective illustration, similar to FIG. 17, of the holding ring of the fourth exemplary embodiment;

FIG. 21 shows a section along the line 21-21 in FIG. 19;

DETAILED DESCRIPTION OF THE INVENTION

Figure 1:
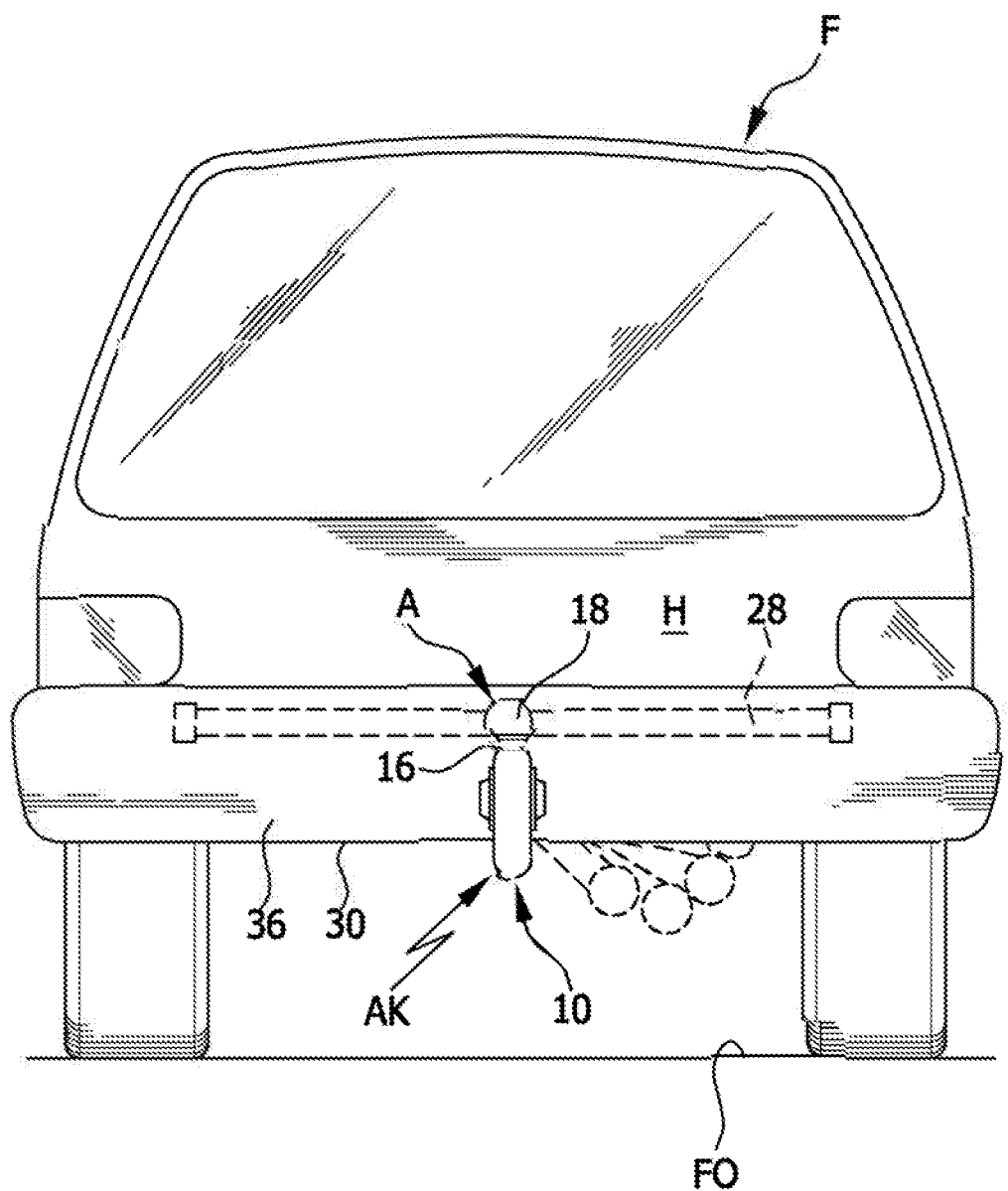
FIG. 1 shows a rear view of a motor vehicle with a trailer hitch according to the invention.
Figure 2:
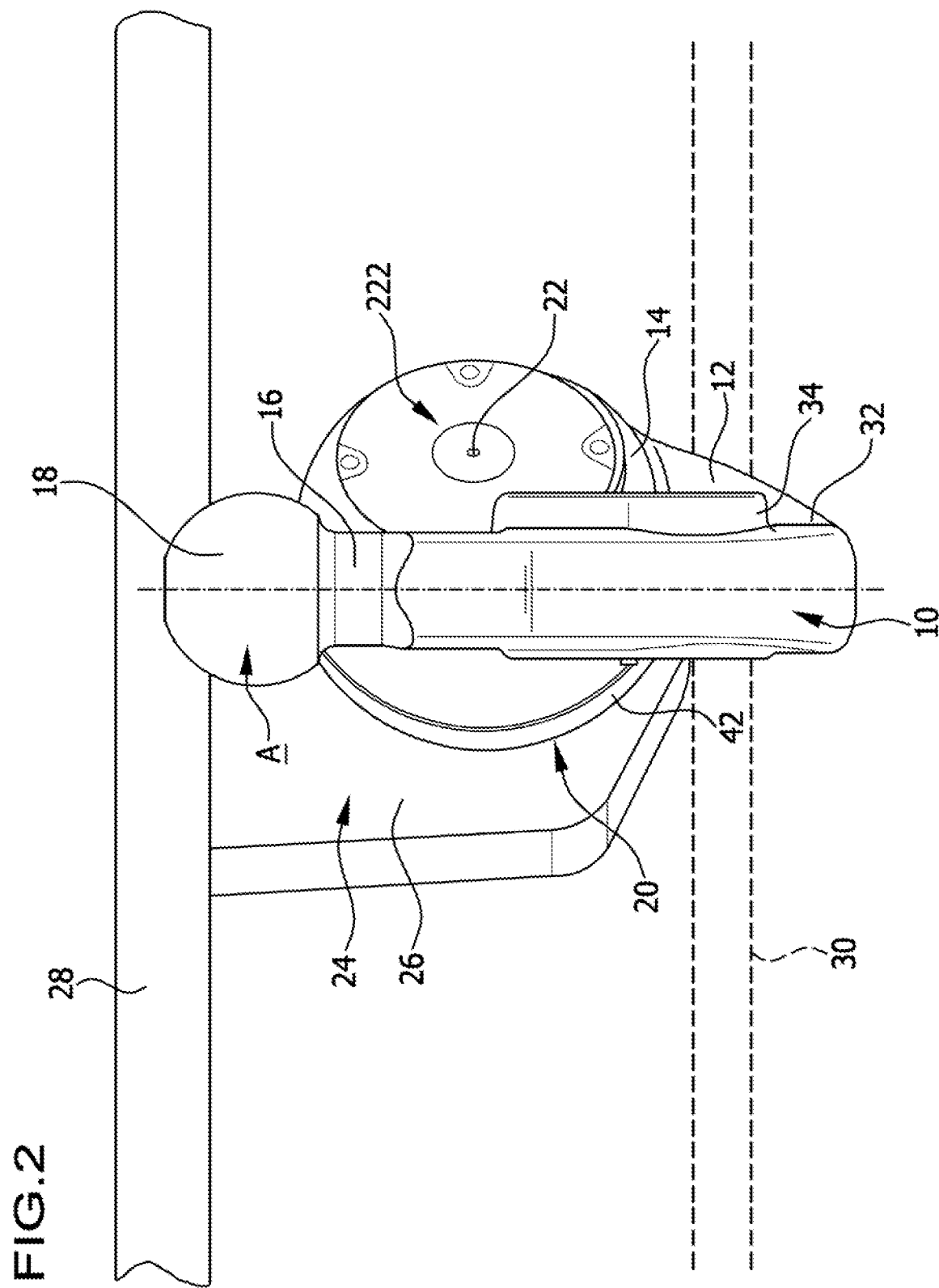
FIG. 2 shows a plan view of a first exemplary embodiment of a trailer hitch according to the invention, with a view in the direction of travel of the trailer hitch mounted on a vehicle rear, wherein the trailer hitch is in its operative position.
Figure 3:
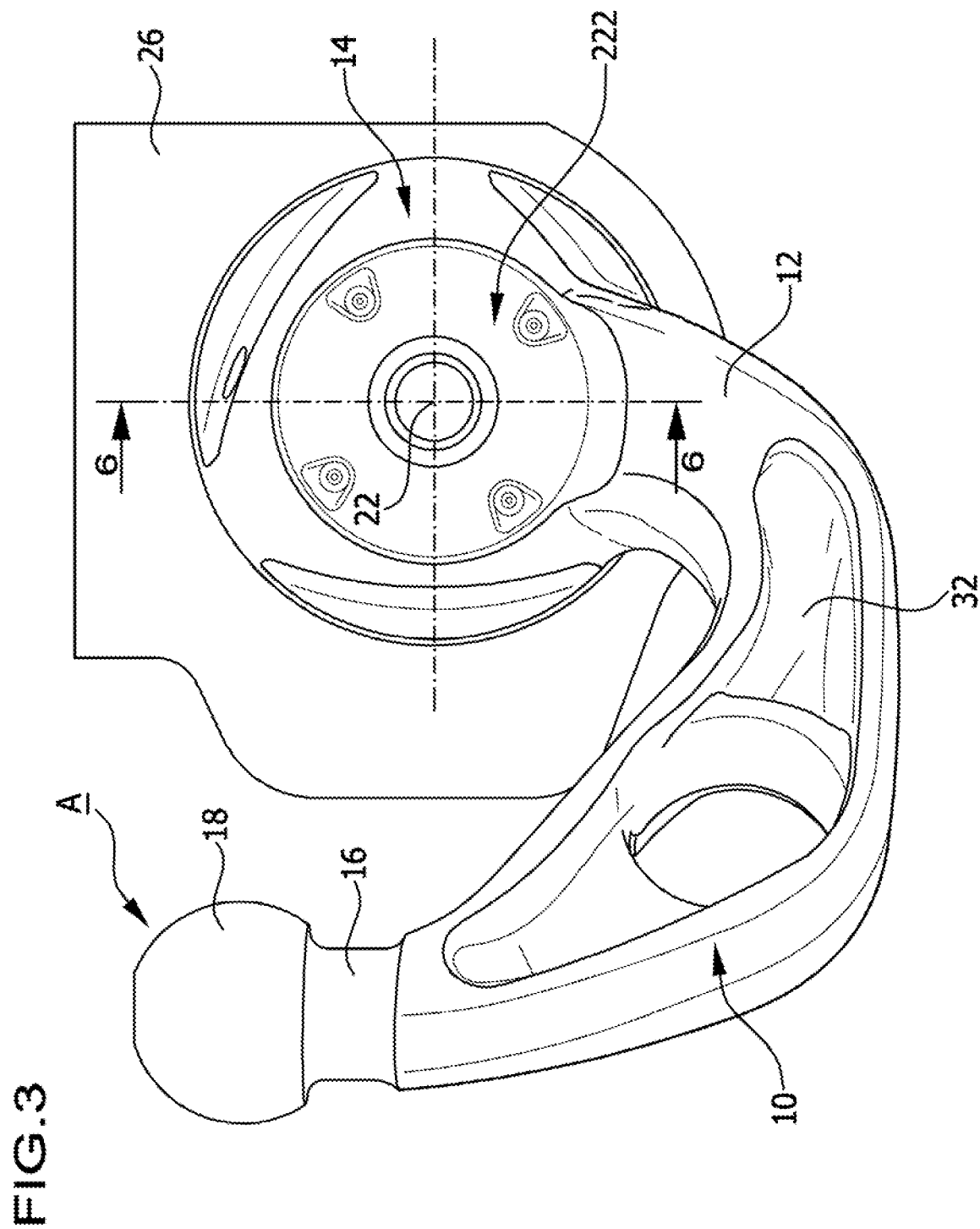
FIG. 3 shows a plan view of the trailer hitch in FIG. 2, in the direction of the pivot axis.
Figure 4:
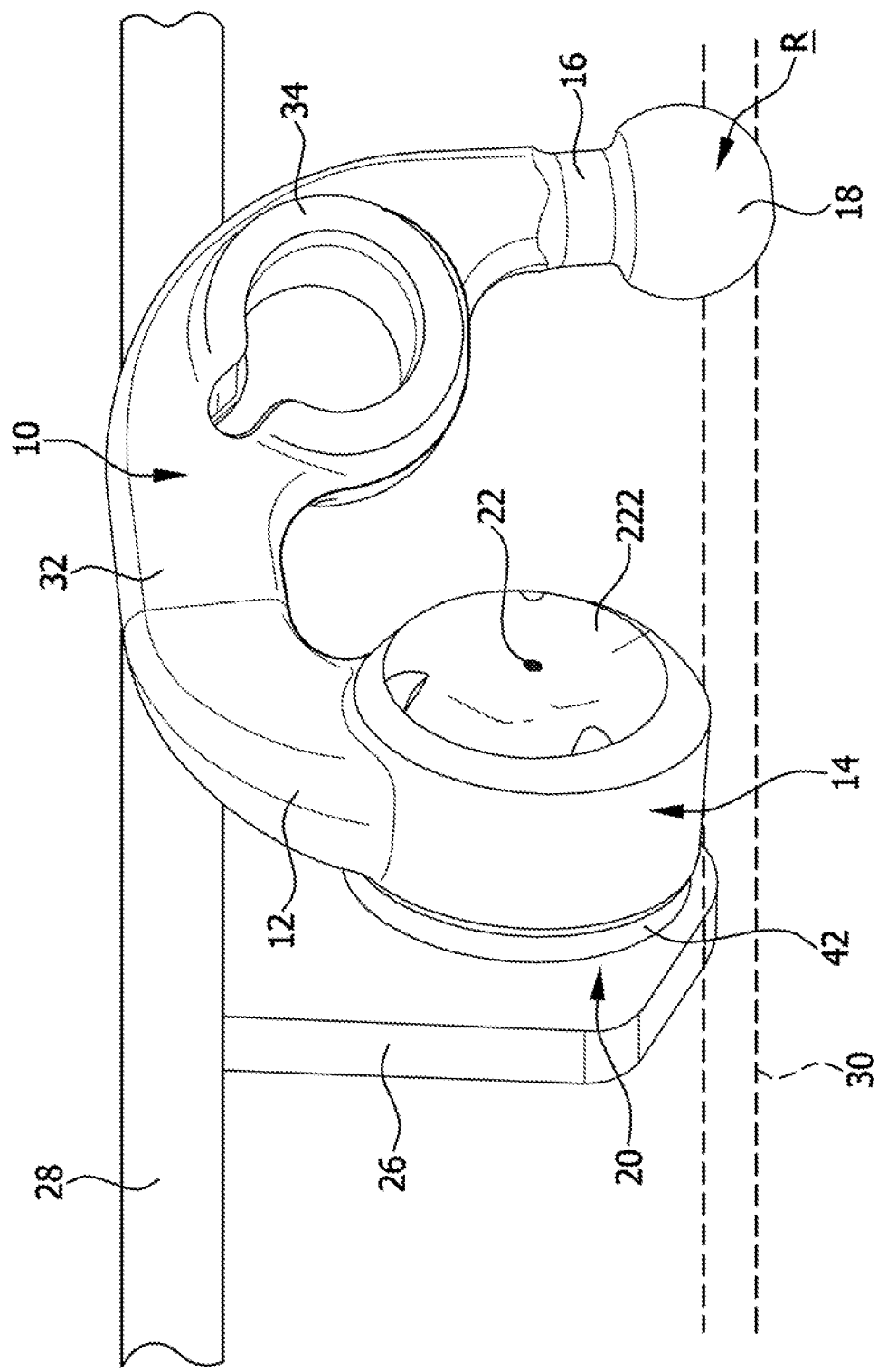
FIG. 4 shows a view corresponding to FIG. 2, of the trailer hitch in the rest position.
Figure 5:
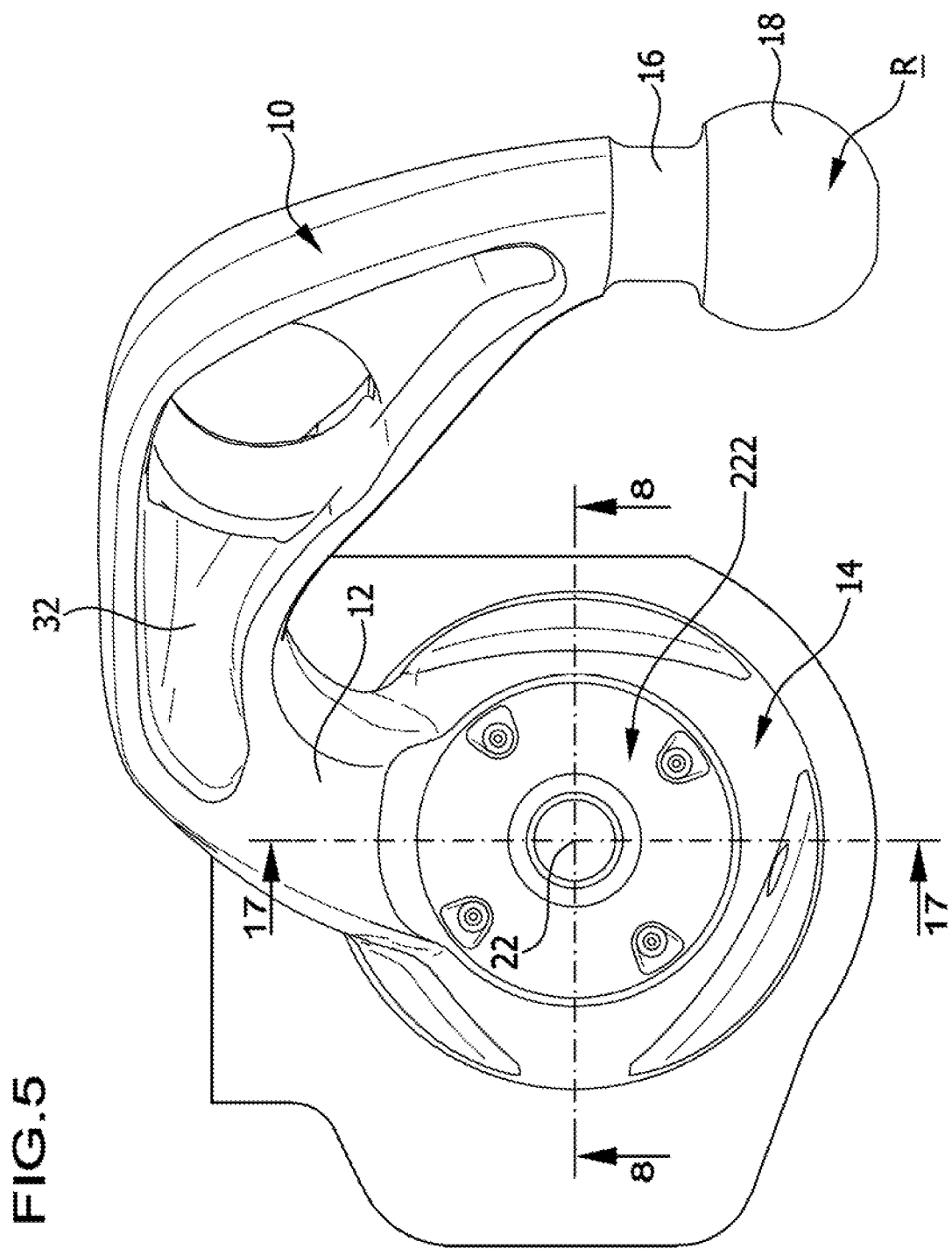
FIG. 5 shows a plan view of the trailer hitch in accordance with the trailer hitch from FIG. 4, in the rest position, in the direction of the pivot axis.

A first exemplary embodiment of a trailer hitch AK according to the invention for a motor vehicle, which is illustrated in an operative position A in FIGS. 1, 2 and 3 and in a rest position R in FIGS. 4 and 5, comprises a ball neck, which is designated 10 as a whole, is held at a first end 12 on a pivot bearing body 14, and carries at a second end 16 a coupling ball, designated 18 as a whole, wherein a coupling ball receiver of a trailer is configured to be fixed on the coupling ball.

The pivot bearing body 14 is mounted such that it is pivotal about a pivot axis 22 in relation to a carrier 24 fixed to the vehicle, by a pivot bearing unit that is designated 20 as a whole, wherein the carrier 24 preferably has a bearing part 26, in the form for example of a carrier plate, which holds the pivot bearing unit 20 and preferably extends in a plane perpendicular to the pivot axis 22, and a transverse carrier 28, which carries the bearing part 26, is fixed to the vehicle and is configured to be secured in known manner to a rear region H of a vehicle body F such that the pivot bearing unit 20 and the carrier 24 are located on a side of a lower edge 30 of a bumper unit 36 that is remote from a road surface FO, and are covered by the bumper unit 36 (FIG. 3).

In the operative position, which is illustrated in FIGS. 1 and 2, the ball neck 10 engages below the lower edge 30 of the bumper unit 36 by means of a portion 32 adjoining the first end 12, such that the second end 16 and the coupling ball 18, together with a plug socket 34, are located on a side of the rear bumper unit 36 remote from the vehicle body F, whereas in the rest position both the pivot bearing unit 20 and also the entire ball neck 10, together with the coupling ball 18, are covered from view from the back by the rear bumper unit 36.

Figure 6:
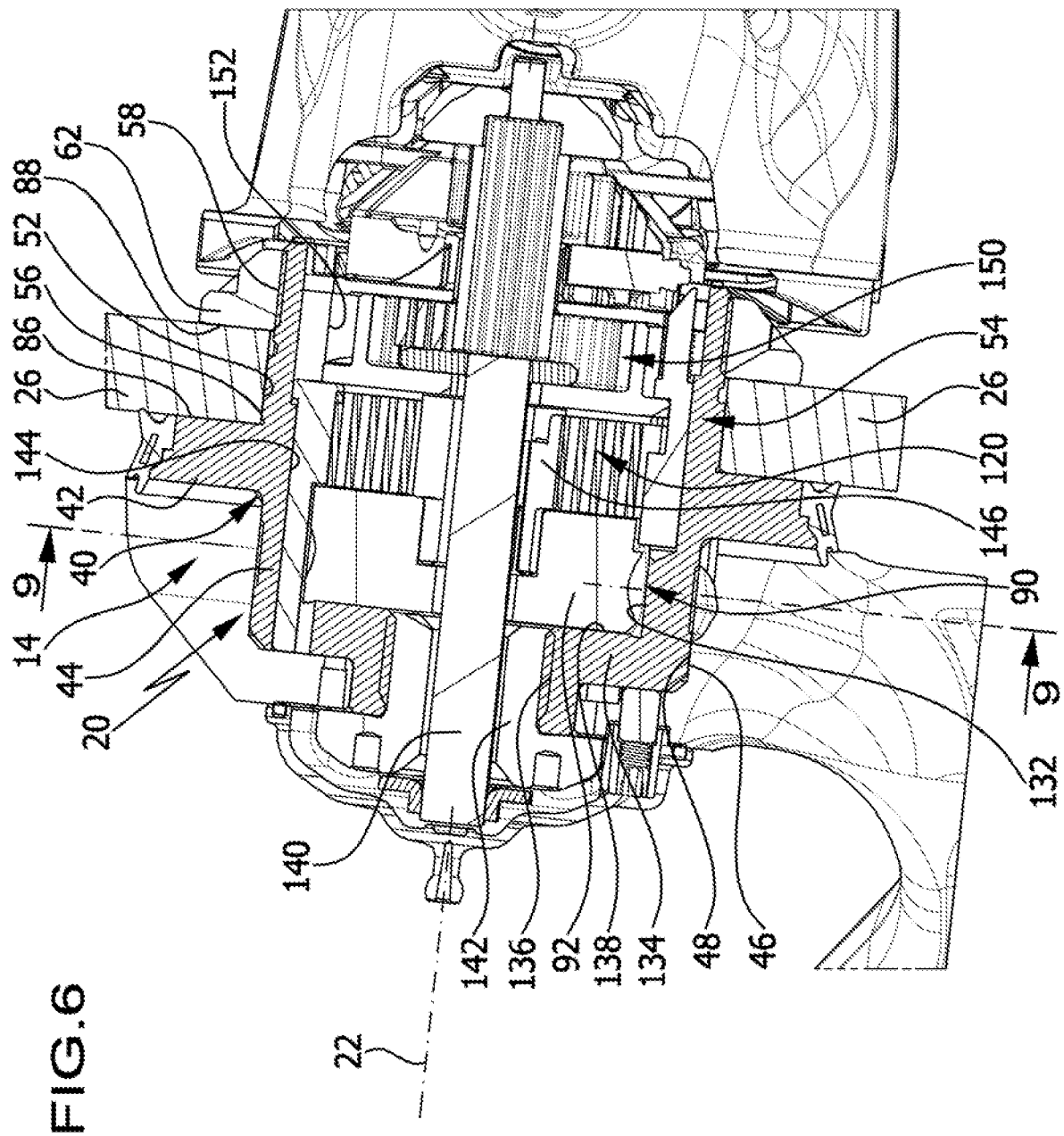
FIG. 6 shows an illustration of a section along the line 6-6 in FIG. 3.
Figure 7:
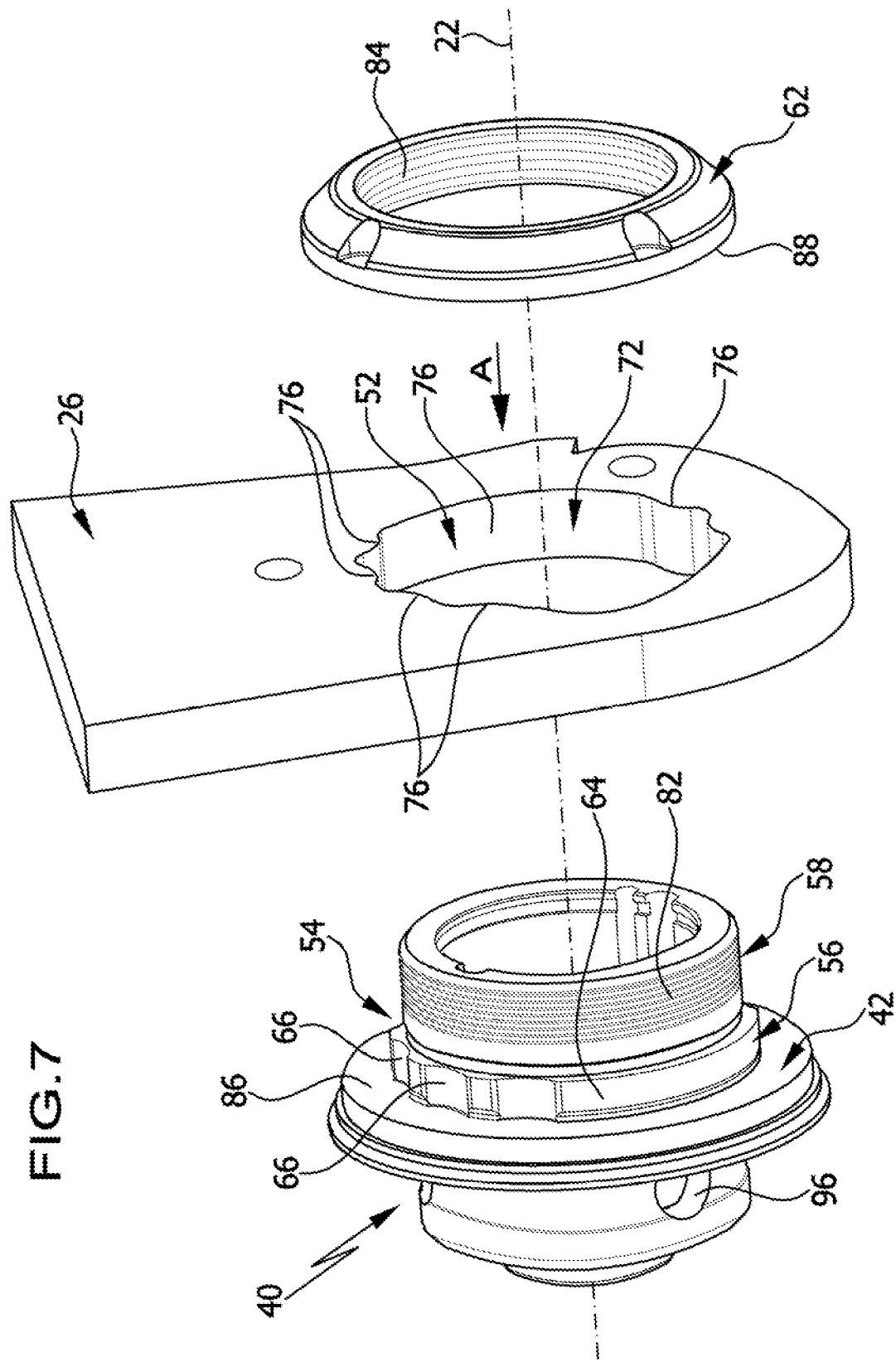
FIG. 7 shows a perspective exploded illustration of a first exemplary embodiment of the pivot bearing housing and the bearing part, before assembly.
Figure 8:
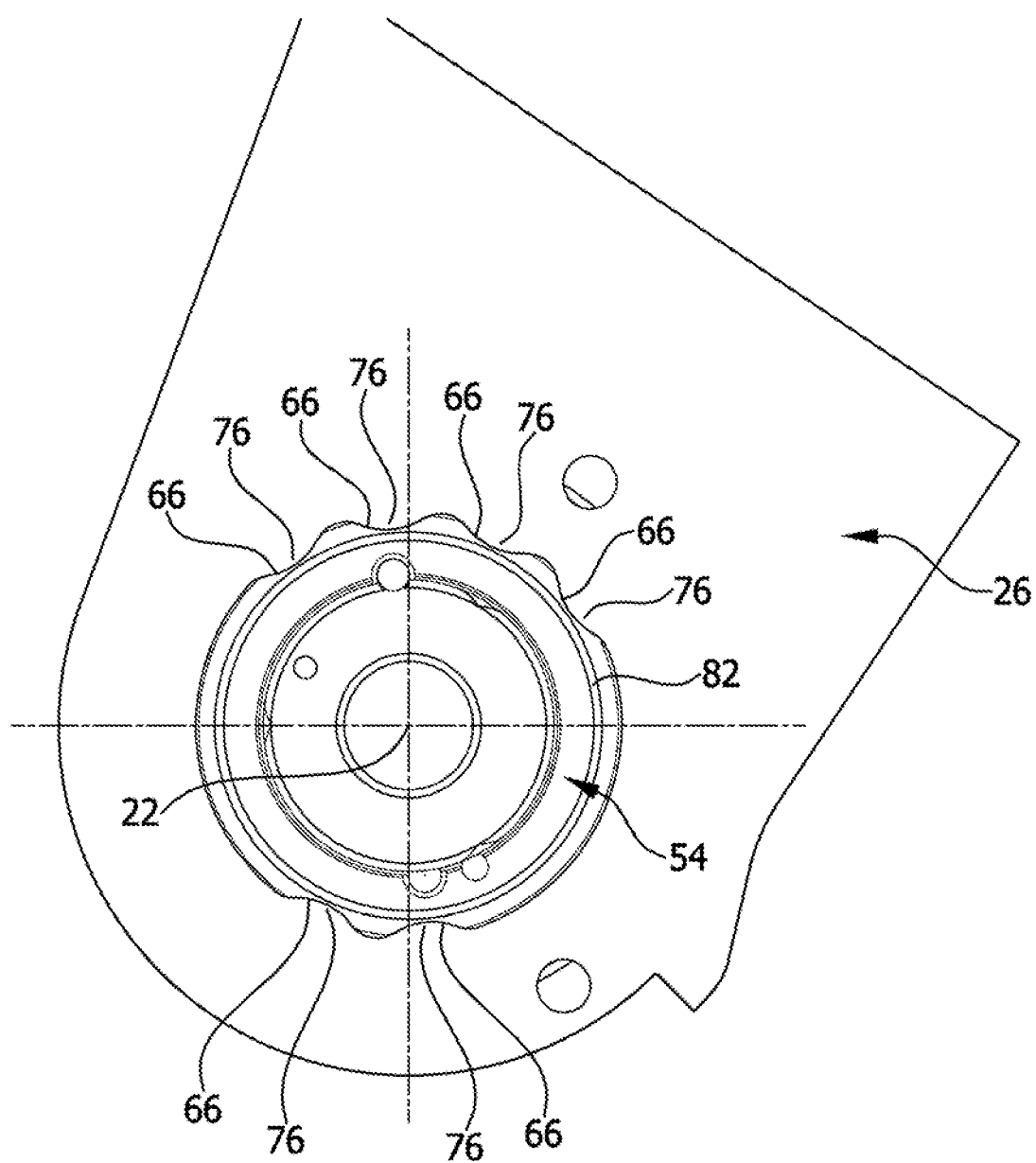

As illustrated in FIGS. 6 to 8, the pivot bearing unit 20 comprises a pivot bearing housing 40, which abuts against the bearing part 26 by means of a support flange 42 integrally formed in one piece with the pivot bearing housing 40, and comprises a guide sleeve 44 that extends away from the bearing part 26, starting from the flange 42, wherein the pivot bearing body 14 is rotatably mounted on the guide sleeve 44.

For this purpose, the guide sleeve 44 comprises a cylindrical outer face 46 against which the pivot bearing body 14 abuts by means of a cylindrical inner face 48 and hence undergoes rotary guidance around the axis 22 about the pivot axis 22, with the result that the pivot bearing body 14 is rotatable in relation to the guide body 40 such that the ball neck 10 is pivotal from the operative position A to the rest position R and vice versa.

Moreover, the pivot bearing housing 40 comprises a projecting portion 54 that extends through an aperture 52, which forms a receptacle for the pivot bearing housing 40, in the bearing part 26 and has an external contour 56 that abuts against the aperture 52 and, on an opposite side of the external contour 56 to the flange 42, has a holding receptacle 58 arranged on the projecting portion 54, for a holding ring 62 that is configured to be fixed to the holding receptacle 58, wherein the guide body 40 is seated in the bearing part 26 in a manner preventing rotation, as a result of positive engagement, by the projecting portion 54 as a result of its non-rotationally symmetrical but, rather, radially varying external contour 56 in the correspondingly shaped aperture 52 (FIG. 7), and is fixed by the flange 42 and the holding ring 62, which abut against opposite sides of the bearing part 26 taking the form of a carrier plate, thereto.

In particular, the radially varying external contour 56 takes a form such that it has recesses 66 that run inward in a manner differing from a circle-cylindrical outer face 64—in particular radially toward the pivot axis 22—and have for example the superficial shape of an inner face of a cylinder segment, in particular a circle-cylinder segment, wherein a plurality of such recesses 66 are provided in the projecting portion 54, offset from one another by an angle in relation to the pivot axis 22, as illustrated in FIG. 8.

Further, the aperture 52 in the bearing part 26 is provided with a radially varying internal contour 72 that corresponds with the external contour 56 and has a circle-cylindrical inner face 74 for receiving the circle-cylindrical outer face 64, wherein projections 76 projecting radially inward, in particular toward the pivot axis 22, extend from the inner face 74 and take the shape of outer faces of circle-cylindrical segments and, when the projecting portion 54 extends through the aperture 52, penetrate into the recesses 66 in order to fix in the aperture 52 the projecting portion 54 with positive engagement and such that it is prevented from rotating in relation thereto.

The holding receptacle 58 takes the form for example of an external thread 82 onto which the holding ring 62 is screwed by means of an internal thread 84, with the result that the holding ring 62 is fixed on the projecting portion 54 in a manner preventing movement in the direction of the pivot axis 22.

Consequently, the pivot bearing housing 40 is fixed in relation to the bearing part by the flange 42 and the holding ring 62, which both act as support bodies and abut against the bearing part 26 by means of support faces 86 and 88 on mutually opposing sides (FIG. 6).

Thus, as a result of its fixed connection to the bearing part 26 and the carrier 24, the pivot bearing housing 40 forms the rotary mounting in a manner fixed to the vehicle for the pivot bearing body 14.

For the purpose of fixing the pivot bearing body 14 in the operative position A, the pivot bearing unit 20 is provided with a rotation-blocking device, designated 90 as a whole (FIG. 9), which has an actuation body 92, a plurality of rotation-blocking bodies 94 that are urgeable by the actuation body 92 and of which each is guided such that they are movable in a guide receptacle 96 in the guide sleeve 44 in a guide direction 98 extending substantially radially in relation to the pivot axis 22, and—starting from an inner face 48 of the pivot bearing body 14 and extending into it—receptacles 100 with which the rotation-blocking bodies 94 are configured to be brought into engagement in the operative position A, wherein the receptacles 100 have wall faces that are at a smaller spacing from one another the greater the radial distance from the pivot axis 22.

For the purpose of suitably moving and positioning the rotation-blocking bodies 94 in the guide direction 98, the actuation body 92 is provided with a set, corresponding to the number of rotation-blocking bodies 94, of retraction receptacles 102 and pressure surfaces 106 that adjoin the retraction receptacles 102 in a direction of revolution 104 and take the form of wedge faces acting radially in relation to the pivot axis 22, wherein, in their release position, the rotation-blocking bodies 94 can penetrate far enough into the retraction receptacles 102 (FIG. 10) for them no longer to project beyond an outer face 46 of the guide sleeve 44, and wherein the pressure surfaces 106 each extend increasingly radially outward in relation to the pivot axis 22, from a radially inward starting region 108 that directly adjoins the respective retraction receptacle 102 as their extent in the direction of revolution 104 increases, as far as a radially outward end region 110 and thus, when there is a rotary movement in a direction of rotation 112 of the actuation body 92, act as wedge faces on the rotation-blocking bodies 94 in order to move them into their rotation-blocking position.

Preferably in this case, the pressure surfaces 106 extend in the manner of spiral or involute segments in relation to the pivot axis 22.

Figure 10:
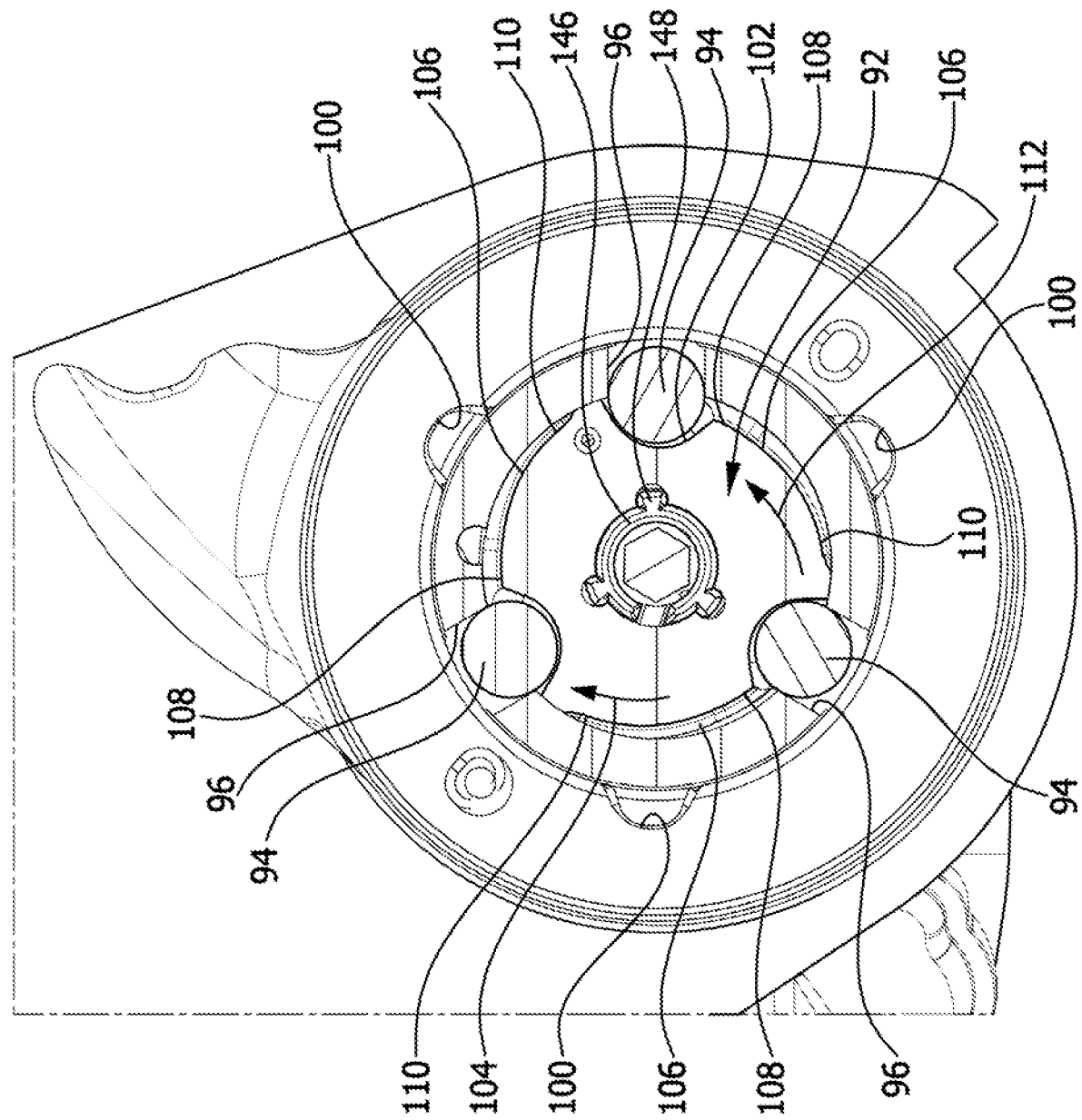
FIG. 10 shows an illustration of a section, similar to FIG. 9, in the rest position.

In order either to keep the rotation-blocking bodies 94 in their rotation-blocking position as a result of their being urged by the pressure surfaces 106 between the starting region 108 and the end region 110, or to allow them to penetrate into the retraction receptacle 102 in the release position, the actuation body 92 is likewise rotatable about the pivot axis 22, in particular coaxially thereto, such that the set of retraction receptacles 102 faces the rotation-blocking bodies 94 and—as illustrated in FIG. 10—in its inactive position allows these to penetrate into the retraction receptacles 102 in the radial direction toward the pivot axis 22 in order to enable the respective rotation-blocking bodies 94 to release the receptacles 100, together with the pivot bearing body 14, in respect of a rotation about the pivot axis 22 in relation to the guide sleeve 44, such that the pivot bearing body 14 and with it the ball neck 10 is freely and unimpededly rotatable in relation to the guide sleeve 44—as illustrated in FIG. 10—in which case the rotation-blocking bodies 94 do not extend beyond the outer face 46 of the guide sleeve 44.

Rotating the actuation body 92 in the direction of rotation 112 in opposition to the direction of revolution 104 when the rotation-blocking bodies 94 are seated in the retraction receptacles 102 has the effect that the rotation-blocking bodies 94 are moved out of the retraction receptacles 102 and first, in the active position of the actuation body 92, lie on the starting regions 108 of the pressure surfaces 106 but in so doing already penetrate into the receptacles 100 and hence prevent the pivot bearing body 14 from being able to rotate freely in relation to the guide sleeve 44.

If the actuation body 92 is turned further in the direction of rotation 112, in opposition to the direction of revolution 104, then regions of the pressure surfaces 106 that lie further and further radially outward in relation to the pivot axis 22 act on the rotation-blocking bodies 94, and thus push the rotation-blocking bodies 94 more and more into the receptacles 100 (FIG. 9), in order in this way, in the operative position A of the ball neck 10, to achieve substantially play-free fixing of the pivot bearing body 14 in relation to the pivot bearing housing 40, in this case in relation to the guide sleeve 44.

Figure 9:
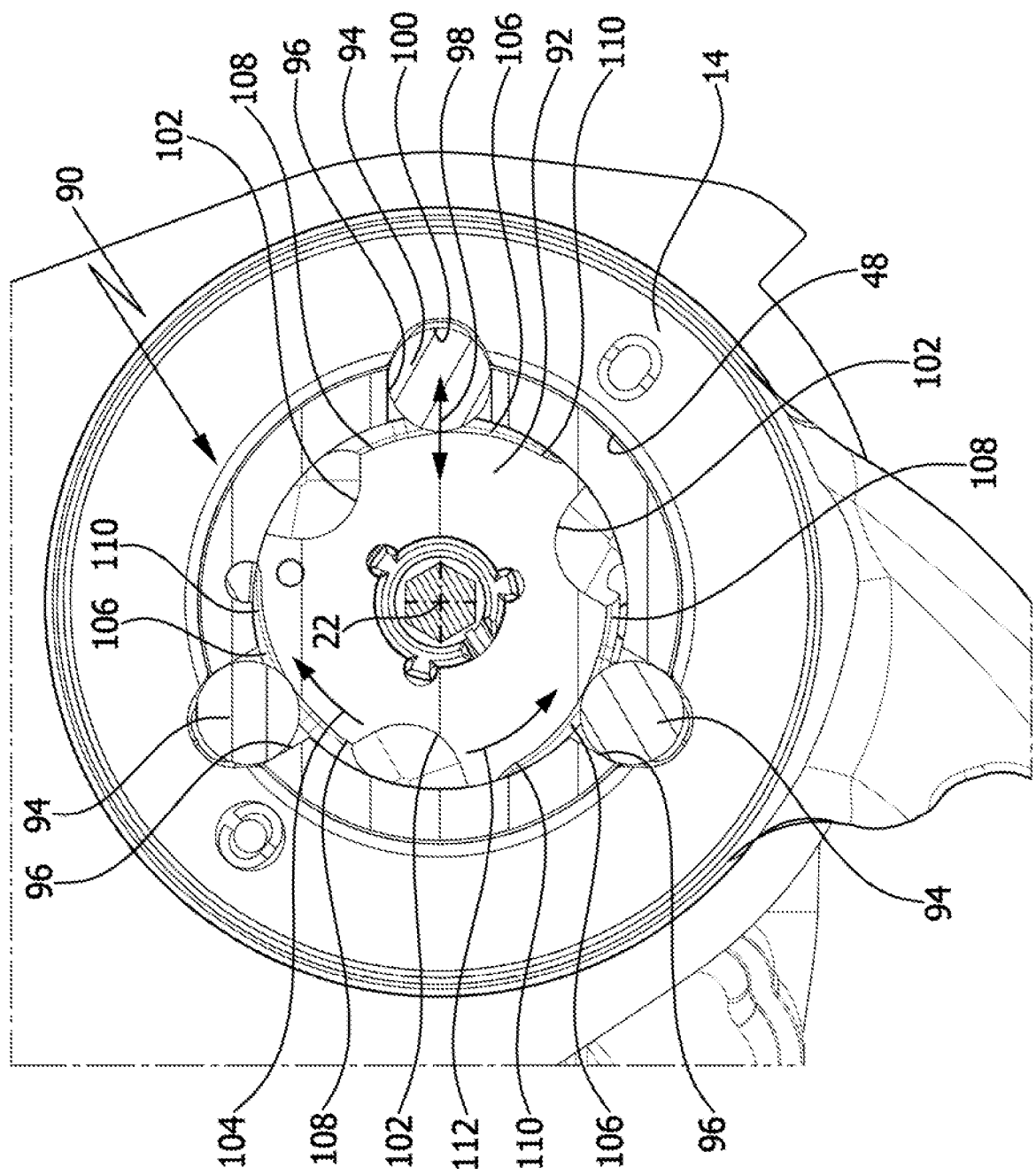
FIG. 9 shows a section along the line 9-9 in FIG. 6, in the operative position.

In the rotation-blocking position of the rotation-blocking bodies 94, the actuation body 92 is in its active position in such a way that—as illustrated in FIG. 9—the rotation-blocking bodies 94 lie approximately on central regions, located between the starting regions 108 and the end regions 110, of the pressure surfaces 106 and are urged thereby.

Preferably, the rotation-blocking bodies 94 are ball-shaped, and thus abut on the one hand against the actuation body 92 and on the other also against the receptacles 100.

In order to cause the actuation body 92 always to move in the direction of rotation 112 without any external influence such that the rotation-blocking bodies 94 move in the direction of the rotation-blocking position, the actuation body 92 is urged by a torsion spring 124 (FIG. 6) that acts on one side on the actuation body 92 and is radially outwardly supported against the pivot bearing housing 40 on the other side.

The torsion spring 124 also has the effect that the actuation body 92 pushes the rotation-blocking bodies 94 into the receptacles 100 under force and thus the pivot bearing body 14 is fixed without play, wherein the freedom from play is maintained even if the geometry of the receptacles 100 changes during operation under load as a result of the actuation body 92 being urged further in the direction of rotation 112.

The guide sleeve 44 extends, by means of a portion forming a receptacle 132 for the actuation body 92, between the flange 42 and a flange 134, which terminates the guide sleeve 44, extends radially toward the pivot axis 22, is preferably integrally formed in one piece with the guide sleeve 44 and delimits the receptacle 132 for the actuation body 92, with the result that the actuation body 92 is guided radially in relation to the pivot axis 22 through the receptacle 132 in the guide sleeve 44 and is guided axially, as seen in the direction of the pivot axis 22, as a result of abutting against an inner side 138 of the flange 134.

The flange 134 further has a receptacle 136, which is coaxial in relation to the pivot axis 22 and into which there is inserted, in particular being screwed, an insert 142, which is seated in the receptacle 136 and through which a pivotal drive shaft 140 passes.

On an opposite side of the receptacle 132 for the actuation body 92 to that with the flange 134, the guide sleeve 44 forms, for example by means of a portion passing partly through the flange 42, a torsion spring receptacle 144 in which, adjoining the actuation body 92, there is arranged the torsion spring 124, which is fixed at one end, by an outer end, in the torsion spring receptacle 144 and, by an inner end, to a drive sleeve 146 that is coupled to the actuation body 92 in a manner preventing rotation in relation thereto.

For this purpose, the drive sleeve 146, as illustrated in FIGS. 9 and 10, is provided for example with projecting portions 148 that, for the purpose of making a positively engaging connection, engage in corresponding recesses in the actuation body 92.

Because the torsion spring 124 acts on the drive sleeve 146, which is coupled to the actuation body 92 in a manner preventing rotation in relation thereto, the action of the torsion spring 124 on the drive sleeve 146 drives the actuation body 92 in the direction of rotation 112, with the result that if the torsion spring 124 acts unimpededly on the drive sleeve 146 the actuation body 92 always urges the actuation body 92 such that it tends to press the rotation-blocking bodies 94 into the receptacles 100 under force and thus to fix the pivot bearing body 14 in a manner preventing rotation in relation to the guide sleeve 44, in particular without play.

So that the rotation-blocking bodies 94 can be moved into the release position, action on the actuation body 92 in opposition to the direction of rotation 112 and thus also in opposition to the action of the torsion spring 124 is required.

For this purpose, the drive sleeve 146 is drivable by means of a planetary gear 130, which is designated 150 as a whole (FIG. 6) and is arranged in a gear seating 152 in the guide sleeve 44, in particular coaxially in relation to the pivot axis 22, and is arranged for example partly within the aperture 52 in the bearing part 26 and preferably extends beyond the aperture 52 in the bearing part 26 on an opposite side to the flange 42.

One way of moving the rotation-blocking bodies 94 into the release position and, as an alternative, of driving the pivot drive shaft 140 is described in European patent applications EP 3 141 405 A or EP 3 141 406 A, which are incorporated herein by reference, wherein the rotation-blocking device 90 merely fixes the pivot bearing body 14 in the operative position A, and a rest position latching device for fixing the pivot bearing body 14 in the rest position is provided and described, so the statements made in this regard in these patent applications are incorporated herein by reference.

However, it is also possible to use the rotation-blocking device 90 to fix the pivot bearing body 14 in both the operative position A and the rest position R, as described in European patent applications EP 1 886 847, EP 2 141 034, EP 2 266 820, which are incorporated herein by reference.

In a second exemplary embodiment of a trailer hitch according to the invention, illustrated in FIGS. 11 to 14, the pivot bearing housing 40' is likewise provided with the guide sleeve 44 and the flange 42, and moreover the projecting portion 54 takes the same form in the region of its external contour 56 as that described in conjunction with the first exemplary embodiment, so the statements made in this regard in relation to the first exemplary embodiment are incorporated herein by reference in their entirety, wherein the same elements are designated by the same reference numerals.

Similarly, the aperture 52 is provided with the same internal contour 72, so likewise the statements made in this regard in relation to the first exemplary embodiment can be incorporated herein by reference in their entirety.

Unlike the first exemplary embodiment, however, the holding receptacle 58' for the holding ring 62' takes a different form.

In the second exemplary embodiment, the holding receptacle 58' takes the form of a groove 162 that runs, recessed in the direction of the pivot axis 22 in relation to the circle-cylindrical outer face 64 of the external contour 56, as far as a groove root 164, which thus runs at a smaller radial spacing from the pivot axis 22 than the circle-cylindrical outer face 64.

Thus, there is formed between the external contour 56 and the groove root 164 a groove wall 166. Opposite the groove wall 166, the groove 162 likewise has a groove wall 168, which is formed between the groove root 164 and an external contour 172 of a flange body 174 delimiting the groove 162, wherein the flange body 174 is preferably integrally formed in one piece with the pivot bearing housing 40, and the external contour 172 has the same shape as the external contour 56, for the purpose of simplified machining.

Preferably, starting from the groove root 164 with increasing radial extent, the groove wall 168 extends in conically widening manner up to the external contour 172 with increasing spacing to the groove wall 166 and thus in particular to the pivot axis 22, and forms a wedge face 170.

Figure 11:
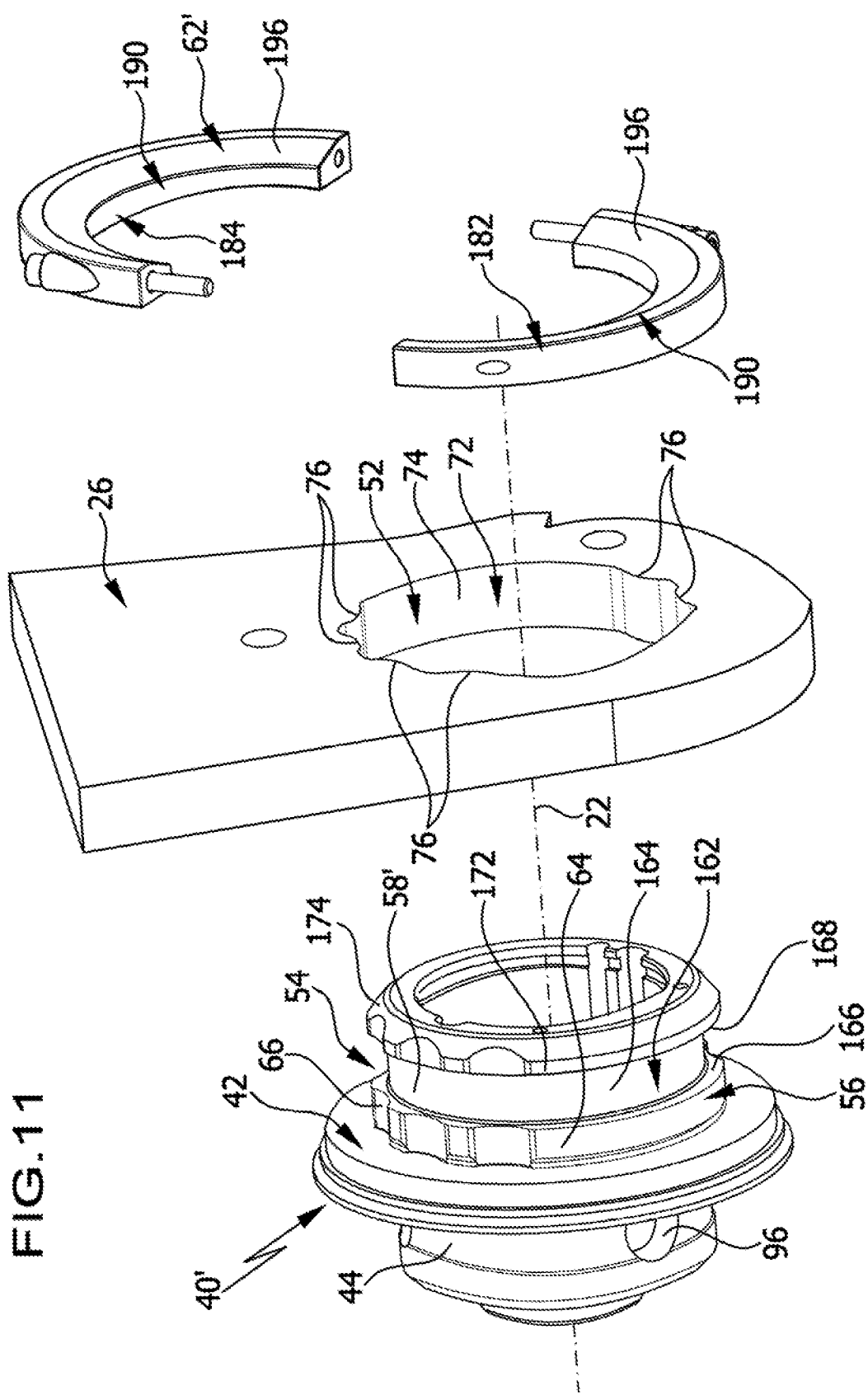
Figure 14:
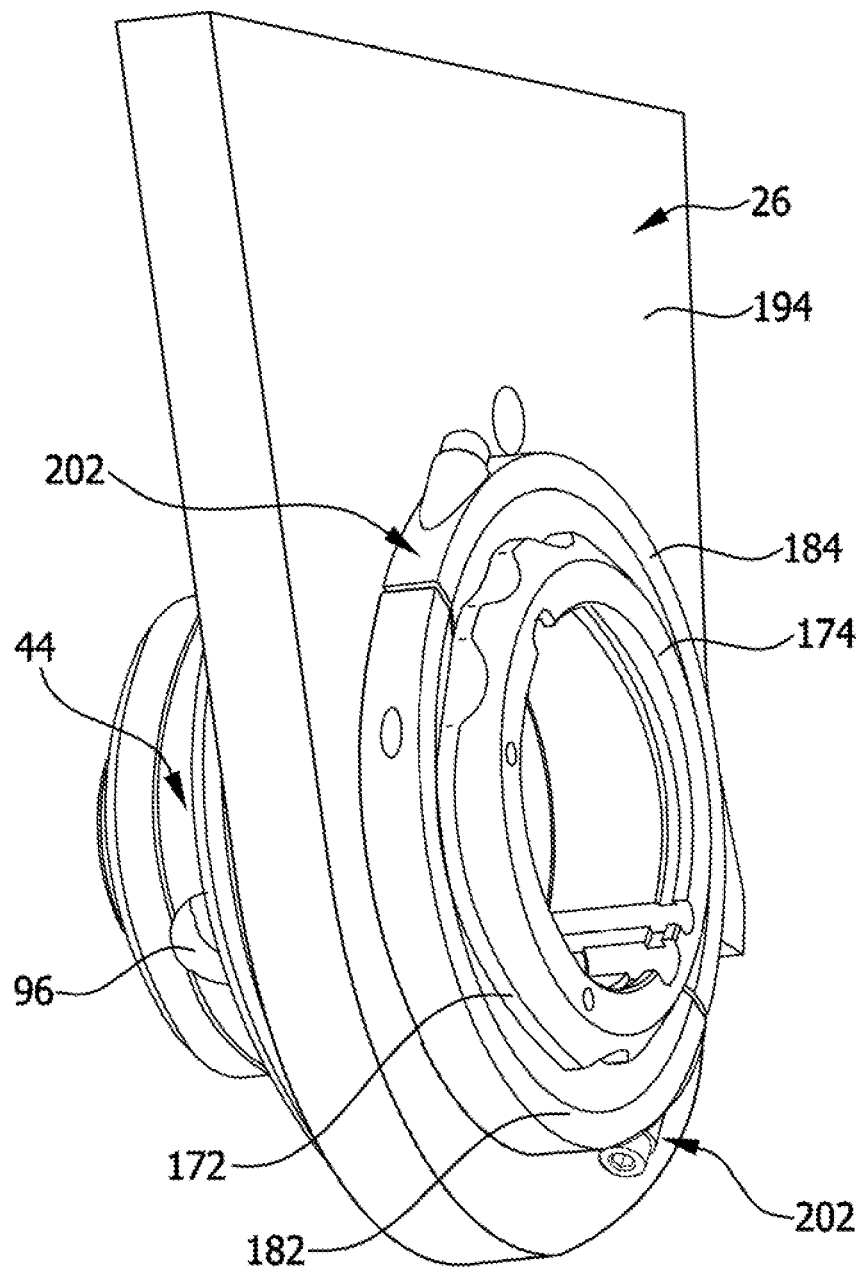
FIG. 14 shows a perspective illustration of the pivot bearing housing and the bearing part from FIG. 1, after assembly.
Figure 22:
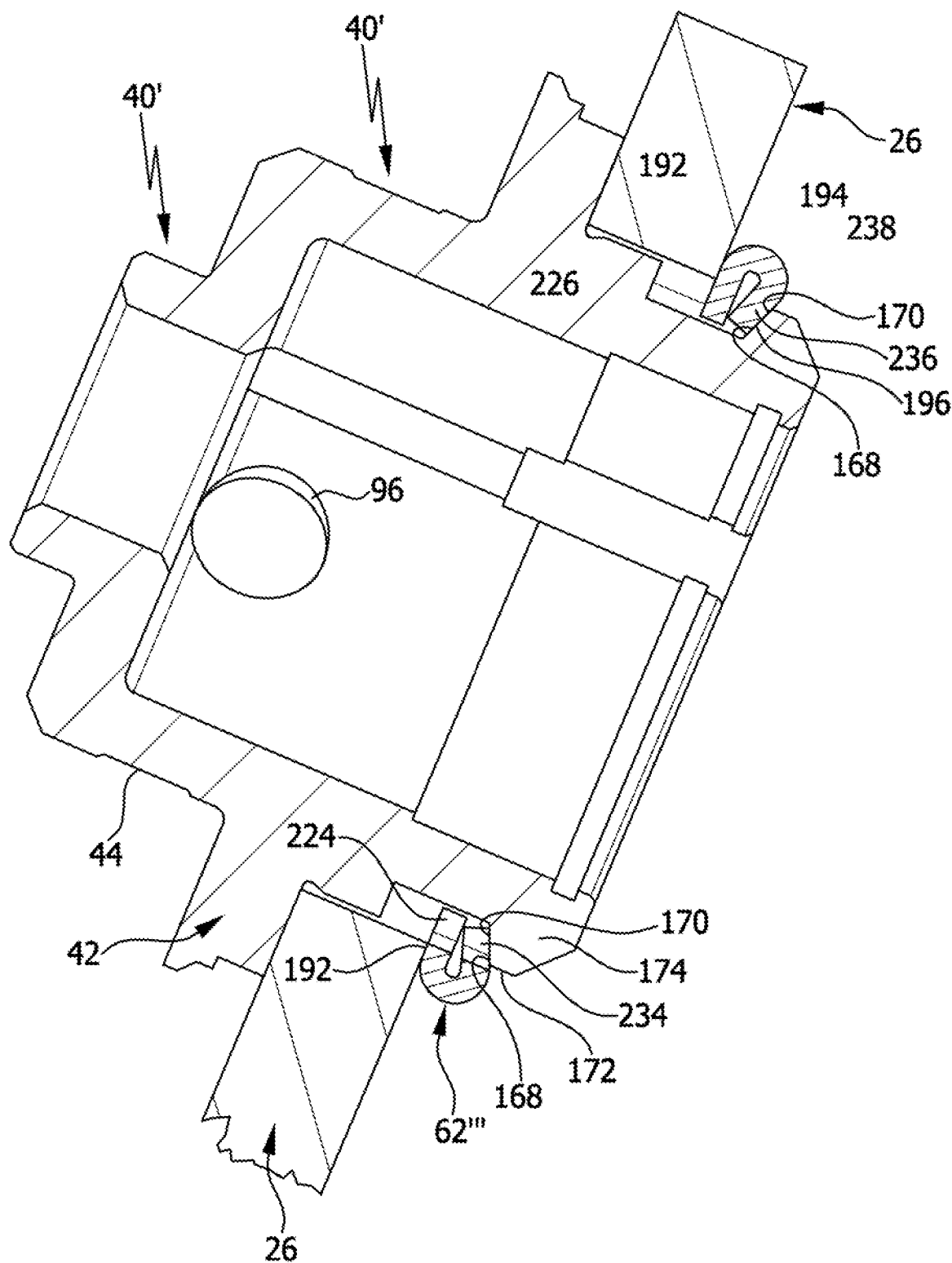
FIG. 22 shows a section along the line 22-22 in FIG. 23.
Figure 23:
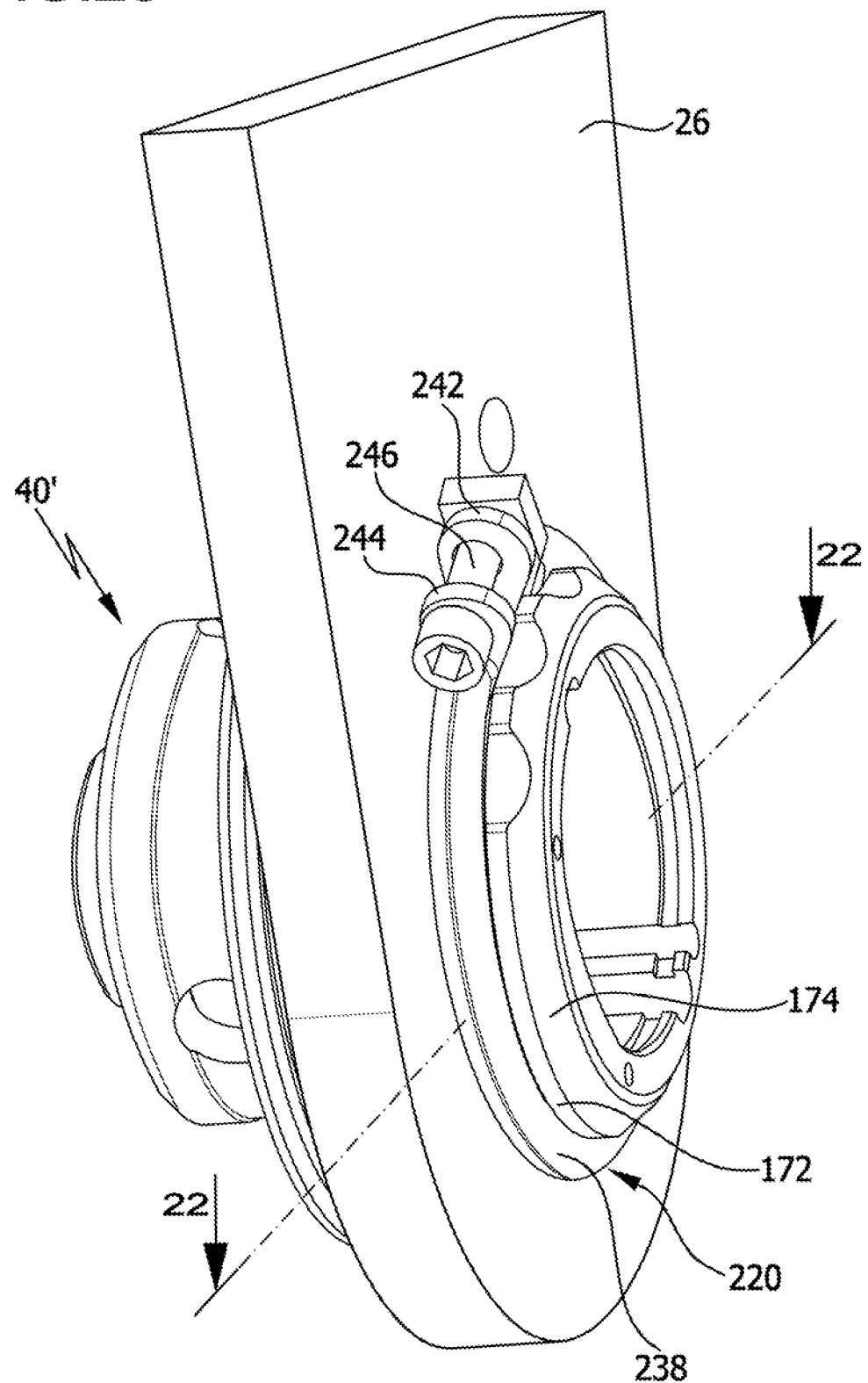
FIG. 23 shows a perspective illustration of the fourth exemplary embodiment, mounted on the bearing part.

This provides the possibility in the second exemplary embodiment of the holding ring 62' taking the form of an annular body that is divided into two, with two ring segments 182 and 184, as illustrated in FIGS. 11 and 13, wherein each of the ring segments 182 and 184 forms a wedge body 190 that has a support face 192 by means of which the wedge body 190 can be supported against a surface 194 of the bearing part 26 that surrounds the aperture 52, and has a wedge face 196 that likewise runs conically— in particular conically in relation to the pivot axis 52—that is opposite the support face 192 and by means of which the respective ring segment 182, 184 is supported against the wedge face 170 of the groove wall 168 and is thus able, because of its wedge action, to cause the pivot bearing housing 40 having the flange 42 to abut against the bearing part 26 under force on the one side, and thus to clamp the bearing part 26 between itself and the flange 42, as a result of which at the same time the pivot bearing housing 40 is fixed in the axial direction of the pivot axis 22 in relation to the bearing part 26, wherein additional fixing in a manner preventing relative rotation is provided by the radially varying external contour 56, which is fixed in a manner preventing relative rotation in the aperture 52, which is likewise provided with the radially varying internal contour 72, in the manner already described in conjunction with the first exemplary embodiment.

The two ring segments 182 and 184 of the holding ring 62' are preferably configured to be urged in the direction of their plane of separation 204 by clamping devices 202, with the result that both ring segments 182 and 184 can be clamped in the direction toward one another in order to clamp the pivot bearing housing 40 in relation to the bearing part 26 in the manner described.

Preferably, the clamping devices 202 are formed by screws 206 that are screwed into one of the ring segments 182, 184 and are screwed into threaded bores 208 in the respectively other ring segment 184, 182, as a result of which these screws 206 clamp the ring segments 182 and 184 in the direction toward one another.

Otherwise, in the second exemplary embodiment the elements that are identical to those in the first exemplary embodiment are provided with the same reference numerals, so the statements made in relation to the first exemplary embodiment can be incorporated herein by reference in their entirety.

In a third exemplary embodiment of a trailer hitch according to the invention, illustrated in FIGS. 15 to 17, in particular the pivot bearing housing 40' and the elements provided with the same reference numerals take the same form as in the first and second exemplary embodiments, so the statements made in this regard in relation to the exemplary embodiments above, in particular in relation to the second exemplary embodiment, can be incorporated herein by reference in their entirety.

The aperture 52 also takes the same form as in the first exemplary embodiment, so the statements made in this regard as well in relation to the first exemplary embodiment can be incorporated herein by reference in their entirety.

Unlike the first and the second exemplary embodiment, the holding ring 62" is provided with a plurality of support elements taking the form of wedge bodies 190', wherein each of the wedge bodies 190' takes the shape of an arc segment and has on the one hand the support face 192 for support against the surface 194 of the bearing part 26 and on the other the wedge face 196, which cooperates with the groove wall 168.

All the wedge bodies 190' are seated within a support element carrier that takes the form of a clamping ring 210, surrounds the wedge bodies 190' on their outer side 212, and has a clamping element that takes the form of a clamping device 214, which can be opened so that the wedge bodies 190' can be brought into engagement with the groove 162 and in so doing can bring them on the one hand into abutment against the surface 194 of the bearing part 26 by means of the support faces 192 and on the other into abutment with the groove wall 168 by means of the wedge face 196, and by means of the clamping element the clamping ring 210 can be clamped such that it narrows in the radial direction relative to the pivot axis such that the clamping ring 210 presses the wedge bodies 190' into the groove 162 and thus brings about clamping of the pivot bearing housing 40 to the bearing part 26 by means of each of the wedge bodies 190' in the same manner as was described in conjunction with the second exemplary embodiment.

In a fourth exemplary embodiment of a trailer hitch according to the invention, illustrated in FIGS. 18 to 23, the pivot bearing housing 40' and the elements that are provided with the same reference numerals take the same form as in the exemplary embodiments above, so the statements made in this regard in relation to the exemplary embodiments above, in particular the third exemplary embodiment, can be incorporated herein by reference in their entirety.

The aperture 52 also takes the same form as in the exemplary embodiments above, so the statements made in this regard as well in relation to the exemplary embodiments above can be incorporated herein by reference in their entirety.

Unlike the exemplary embodiments above, in particular the third exemplary embodiment, the holding ring 62''' is provided with a plurality of wedge bodies 190", each of which takes the shape of a segment, and each of the wedge bodies 190" has a support face 192 for support against the surface 194 of the bearing part 26 and on the other hand a wedge face 196, which cooperates with the groove wall 168.

In this case, as illustrated in FIG. 21, the wedge bodies 190" are formed by a strip of material 220 that is folded into a U shape and whereof one limb 222 is provided with punched holes 224 that divides the limb 222 into individual sub-segments 226, and whereof the other limb 232 is likewise provided with punched holes 234 that in this way divides the limb 232 into sub-segments 236, wherein the sub-segments 226 and 236 are identical in shape and take a form in relation to one another such that, starting from a U-shaped spine 238 that connects the sub-segments 226 and 236, they extend toward one another, which has the effect that the sub-segments 236 each form a wedge face 196 that extends in a wedge shape in relation to the support face 192, formed by the sub-segment 226.

An elongate strip of this kind is bent into an annular body, wherein in particular the spine 238 takes on the shape of a ring and the sub-segments 226 and 236 are arranged along a circle arc formed by the spine 238, wherein the spine 238 forms a carrier for the sub-segments 226 and 236.

In particular, the carrier 238 is provided on its end face with radially outwardly projecting flanges 242 and 244 that are each movable toward one another by a clamping element that takes the form of a clamping device 246, in order in this way to move the wedge bodies 190" into the groove 162 so that the wedge faces 196 cooperate with the wedge face 170 of the groove wall 168, in order to clamp the bearing part 26 between the support bodies 42 and 62 and fix them there.

The invention claimed is:

1. A trailer hitch, comprising a ball neck, which is movable between an operative position and a rest position and has a pivot bearing body arranged at a first end and a coupling ball arranged at a second end, a pivot bearing unit, which is arranged fixed to the vehicle by means of a carrier that is configured to be secured to a vehicle body, wherein by means of the pivot bearing unit, which has a pivot bearing housing, the pivot bearing body is mounted such that it is pivotal about a pivot axis between the operative position and the rest position, and a rotation-blocking device that, in at least one rotation-blocking position, blocks a pivotal movement of the pivot bearing body about the pivot axis in relation to the pivot bearing unit and, in a release position, releases such pivotal movement, the pivot bearing housing passes through a receptacle in a bearing part of the carrier and in so doing is held by positively engaging elements such that it cannot rotate in relation thereto, and on either side of the receptacle the pivot bearing housing is fixed by support bodies that abut against the bearing part and are supported against both the pivot bearing housing and the bearing part, and wherein the pivot bearing housing has a projecting portion that passes through the receptacle in the bearing part.

2. The trailer hitch as claimed in claim 1, wherein the support bodies are supported against the bearing part by support faces outside the receptacle.

3. The trailer hitch as claimed in claim 1, wherein the bearing part is clamped between the support bodies.

4. The trailer hitch as claimed in claim 3, wherein at least the support face of at least one of the support bodies is movable in relation to the pivot bearing housing in the direction of the other support body by elements bringing about clamping.

5. The trailer hitch as claimed in claim 1, wherein the receptacle in the bearing part is formed by an aperture therein.

6. The trailer hitch as claimed in claim 1, wherein the positively engaging elements have complementary contours that differ from a circle contour.

7. The trailer hitch as claimed in claim 1, wherein one of the support bodies is adjustable relative to the pivot bearing housing.

8. A trailer hitch, comprising a ball neck, which is movable between an operative position and a rest position and has a pivot bearing body arranged at a first end and a coupling ball arranged at a second end, a pivot bearing unit, which is arranged fixed to the vehicle by means of a carrier that is configured to be secured to a vehicle body, wherein by means of the pivot bearing unit, which has a pivot bearing housing, the pivot bearing body is mounted such that it is pivotal about a pivot axis between the operative position and the rest position, and a rotation-blocking device that, in at least one rotation-blocking position, blocks a pivotal movement of the pivot bearing body about the pivot axis in relation to the pivot bearing unit and, in a release position, releases such pivotal movement, the pivot bearing housing passes through a receptacle in a bearing part of the carrier and in so doing is held by positively engaging elements such that it cannot rotate in relation thereto, and on either side of the receptacle the pivot bearing housing is fixed by support bodies that abut against the bearing part and are supported against both the pivot bearing housing and the bearing part, wherein the aperture in the bearing part has an internal contour that varies radially in relation to the pivot axis, and wherein a projecting portion of the pivot bearing housing has an external contour that varies radially in relation to the pivot axis.

9. The trailer hitch as claimed in claim 8, wherein the radially varying internal contour of the aperture takes a form corresponding to the radially varying external contour of the projecting portion.

10. A trailer hitch, comprising a ball neck, which is movable between an operative position and a rest position and has a pivot bearing body arranged at a first end and a coupling ball arranged at a second end, a pivot bearing unit, which is arranged fixed to the vehicle by means of a carrier that is configured to be secured to a vehicle body, wherein by means of the pivot bearing unit, which has a pivot bearing housing, the pivot bearing body is mounted such that it is pivotal about a pivot axis between the operative position and the rest position, and a rotation-blocking device that, in at least one rotation-blocking position, blocks a pivotal movement of the pivot bearing body about the pivot axis in relation to the pivot bearing unit and, in a release position, releases such pivotal movement, the pivot bearing housing passes through a receptacle in a bearing part of the carrier and in so doing is held by positively engaging elements such that it cannot rotate in relation thereto, and on either side of the receptacle the pivot bearing housing is fixed by support bodies that abut against the bearing part and are supported against both the pivot bearing housing and the bearing part, wherein one of the support bodies supported against both the pivot bearing housing and the bearing part is arranged fixed to the pivot bearing housing.

11. The trailer hitch as claimed in claim 10, wherein the support body is integrally formed in one piece with the pivot bearing housing.

12. A trailer hitch, comprising a ball neck, which is movable between an operative position and a rest position and has a pivot bearing body arranged at a first end and a coupling ball arranged at a second end, a pivot bearing unit, which is arranged fixed to the vehicle by means of a carrier that is configured to be secured to a vehicle body, wherein by means of the pivot bearing unit, which has a pivot bearing housing, the pivot bearing body is mounted such that it is pivotal about a pivot axis between the operative position and the rest position, and a rotation-blocking device that, in at least one rotation-blocking position, blocks a pivotal movement of the pivot bearing body about the pivot axis in relation to the pivot bearing unit and, in a release position, releases such pivotal movement, the pivot bearing housing passes through a receptacle in a bearing part of the carrier and in so doing is held by positively engaging elements such that it cannot rotate in relation thereto, and on either side of the receptacle the pivot bearing housing is fixed by support bodies that abut against the bearing part and are supported against both the pivot bearing housing and the bearing part, wherein one of the support bodies is adjustable relative to the pivot bearing housing, wherein the support body is held at a holding receptacle of a projecting portion of the pivot bearing housing and is adjustable relative to the pivot bearing housing by a relative movement in relation to the holding receptacle.

13. The trailer hitch as claimed in claim 12, wherein the support body is adjustable relative to the holding receptacle by at least one support element that is arranged on the support body, and at least one support element that cooperates with this support element and is arranged at the holding receptacle, wherein at least one of these has a support face that varies in the radial direction of the projecting portion.

14. The trailer hitch as claimed in claim 13, wherein one of the support elements has a wedge face that is formed on the holding receptacle, and/or the other of the support elements has a wedge body that is movable radially in relation to the projecting portion and has a wedge face.

15. The trailer hitch as claimed in claim 14, wherein a plurality of support elements are provided on the support body.

16. The trailer hitch as claimed in claim 15, wherein the plurality of support elements are formed by two ring segments of a holding ring that are configured to be clamped to one another by clamping devices.

17. The trailer hitch as claimed in claim 13, wherein the holding receptacle takes the form of a groove, and wherein in particular a groove wall forms the wedge face.

18. A trailer hitch, comprising a ball neck, which is movable between an operative position and a rest position and has a pivot bearing body arranged at a first end and a coupling ball arranged at a second end, a pivot bearing unit, which is arranged fixed to the vehicle by means of a carrier that is configured to be secured to a vehicle body, wherein by means of the pivot bearing unit, which has a pivot bearing housing, the pivot bearing body is mounted such that it is pivotal about a pivot axis between the operative position and the rest position, and a rotation-blocking device that, in at least one rotation-blocking position, blocks a pivotal movement of the pivot bearing body about the pivot axis in relation to the pivot bearing unit and, in a release position, releases such pivotal movement, the pivot bearing housing passes through a receptacle in a bearing part of the carrier and in so doing is held by positively engaging elements such that it cannot rotate in relation thereto, and on either side of the receptacle the pivot bearing housing is fixed by support bodies that abut against the bearing part and are supported against both the pivot bearing housing and the bearing part, wherein one of the support bodies is adjustable relative to the pivot bearing housing, wherein the support body is adjustable relative to a holding receptacle of a projecting portion of the pivot bearing housing by at least one support element arranged on the support body and at least one support element that cooperates with this support element and is arranged at the holding receptacle, wherein at least one of these has a support face that varies in the axial direction of the projecting portion.

19. The trailer hitch as claimed in claim 18, wherein at least three support elements in the form of segments, in particular arc segments, are provided and are urged by a support element carrier.

20. The trailer hitch as claimed in claim 19, wherein the support element carrier has the effect of urging the support elements in the direction of the holding receptacle.

21. The trailer hitch as claimed in claim 19, wherein the support element carrier takes the shape of a C, and wherein the ends thereof are moved toward one another by a clamping element.

* * * * *